(12) United States Patent
Seo et al.

(10) Patent No.: US 8,132,100 B2
(45) Date of Patent: Mar. 6, 2012

(54) SCREEN IMAGE PRESENTATION APPARATUS AND METHOD FOR MOBILE PHONE

(75) Inventors: Jeong Wook Seo, Daegu Metropolitan (KR); Jong Kerl Lee, Gumi-si (KR); Wei Jin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 785 days.

(21) Appl. No.: 11/633,641

(22) Filed: Dec. 5, 2006

(65) Prior Publication Data

US 2007/0183381 A1    Aug. 9, 2007

(30) Foreign Application Priority Data

Dec. 6, 2005    (KR) .................. 10-2005-0118428

(51) Int. Cl.
*G06F 3/048* (2006.01)
(52) U.S. Cl. .................. 715/706; 715/848; 715/864
(58) Field of Classification Search .................. 715/706, 715/864, 848–852
See application file for complete search history.

(56) References Cited

U.S. PATENT DOCUMENTS

| | | | |
|---|---|---|---|
| 5,682,469 A * | 10/1997 | Linnett et al. .................. | 345/473 |
| 6,388,665 B1 * | 5/2002 | Linnett et al. .................. | 345/473 |
| 6,753,882 B2 * | 6/2004 | Nakazawa et al. ............. | 715/708 |
| 7,429,989 B2 * | 9/2008 | Kang et al. ..................... | 345/473 |
| 7,441,190 B2 * | 10/2008 | Asami ........................... | 715/706 |
| 7,634,731 B2 * | 12/2009 | Lee ................................ | 715/706 |
| 7,925,976 B2 * | 4/2011 | Shin et al. ...................... | 715/706 |
| 2005/0044500 A1 * | 2/2005 | Orimoto et al. ............... | 715/706 |
| 2005/0190188 A1 | 9/2005 | Anzawa et al. | |
| 2006/0095859 A1 * | 5/2006 | Bocking et al. ............... | 715/764 |
| 2006/0294465 A1 * | 12/2006 | Ronen et al. .................. | 715/706 |

FOREIGN PATENT DOCUMENTS

| | | |
|---|---|---|
| CN | 1481185 A | 3/2004 |
| CN | 1684478 A | 10/2005 |
| CN | 1694463 A | 11/2005 |
| EP | 1 589 735 A2 | 10/2005 |
| JP | 10-033830 | 2/1998 |
| JP | 11-255417 | 9/1999 |
| JP | 2000-049924 | 2/2000 |
| JP | 2004-033690 | 2/2004 |
| KR | 10-2000-0056682 A | 9/2000 |
| KR | 10-2001-0073430 A | 8/2001 |

OTHER PUBLICATIONS

Persson, "Exms: an animated and avatar-based messaging system for espressive peer communication", Proceedings of the 2003 International ACM SIGGROUP conference on Supporting Group Work, Nov. 9-12, 2003, Florida, USA, copyright ACM 2003.*

* cited by examiner

*Primary Examiner* — William Bashore
*Assistant Examiner* — Andrew Tank
(74) *Attorney, Agent, or Firm* — Roylance, Abrams, Berdo & Goodman, L.L.P.

(57) ABSTRACT

An apparatus and method is provided for idle mode screen image presentation device, such as a mobile phone. The screen image presentation apparatus includes a memory for storing a character house including variable and selectable background and function items for executing functions of the mobile phone, a controller for presenting the character house in a given mode, such as an idle mode of the mobile phone, and providing information, when one of the function items is selected, on a function represented by the selected function item, and a display which displays the character house and contents under the control of the controller.

28 Claims, 44 Drawing Sheets

Character House
(Phone Idle View)

FIG. 2A
Character Setting Program-additional module
(decoration & settings)
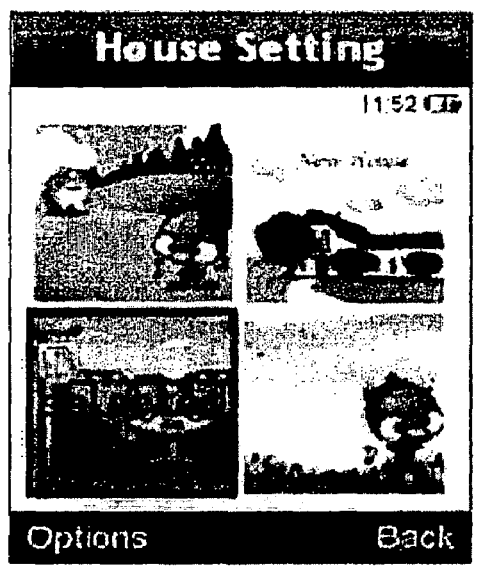
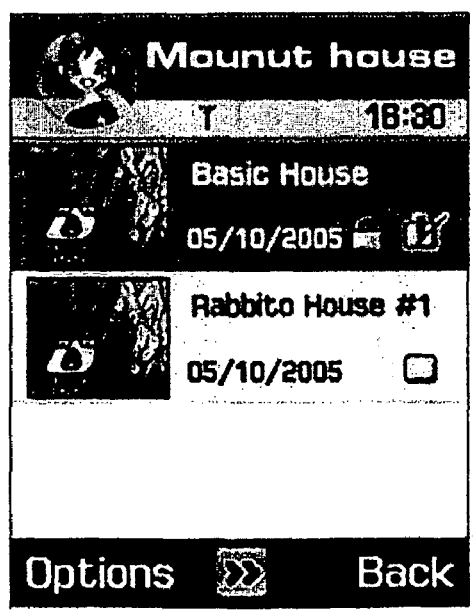

Character House
(Phone Idle View)

1. IDLE

2. Alpha Blending

3. Sound

4. Text

5. Animation

6. IDLE

FIG. 7A
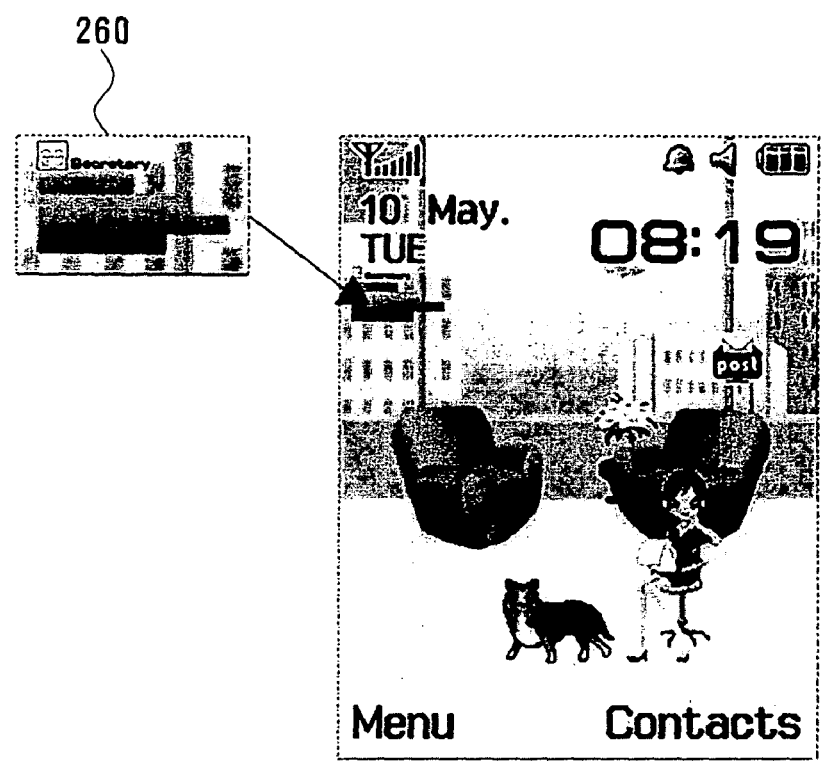
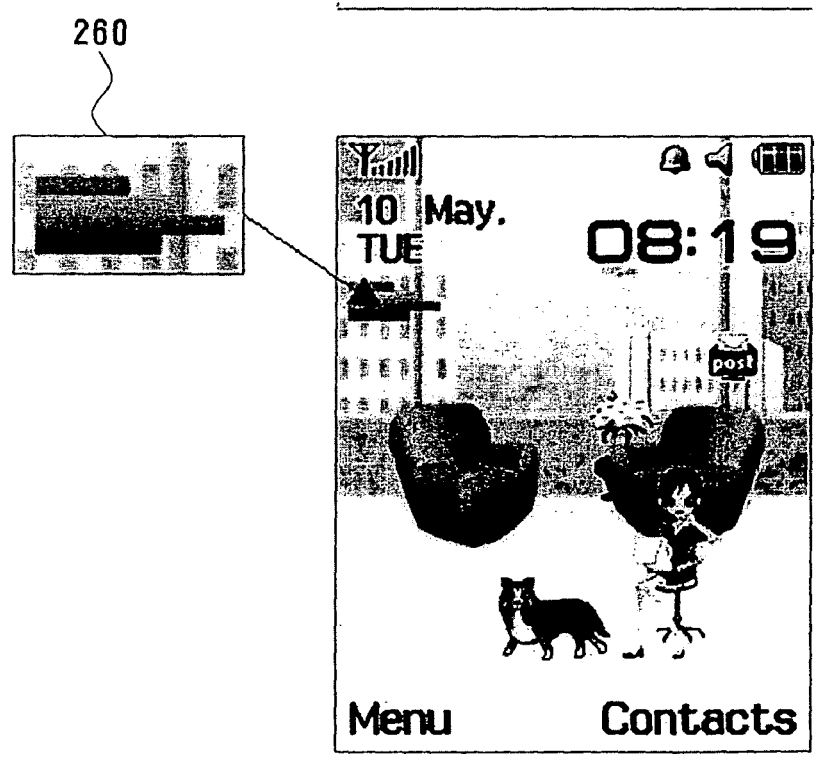

FIG. 8
| EMOTION MODE | Happy | Normal | Angry | Sad | Tired |
|---|---|---|---|---|---|
| |  |  |  |  |  |

1. Normal Mode

2. Select Mode

| Trophy | Clover | Flower pot | Dwarf tree | Flower bed | Chair |

FIG. 11B
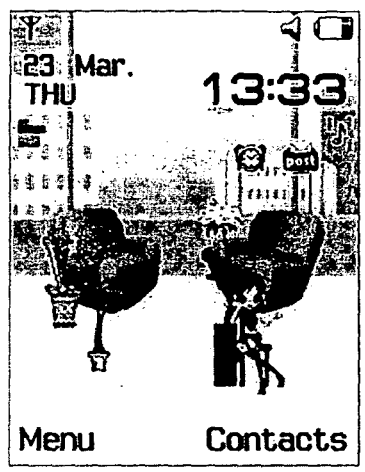 
FIG. 11C
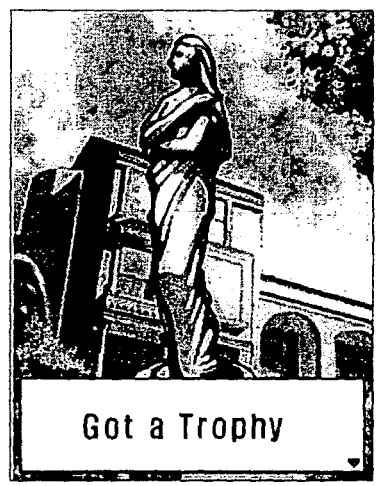 

FIG. 12
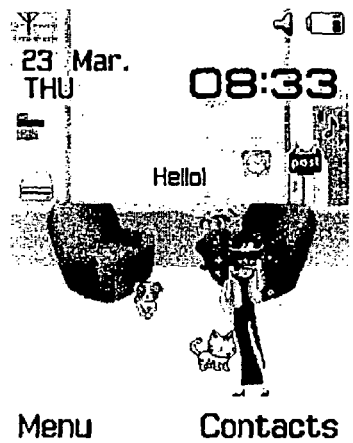 
FIG. 13
TEXT FOR GIFT (TEXT BALLOON WITH TRANSPARENCY 30%)
- Image : item/money
POSITION: BOTTOM LEFT/RIGHT FIG. 27
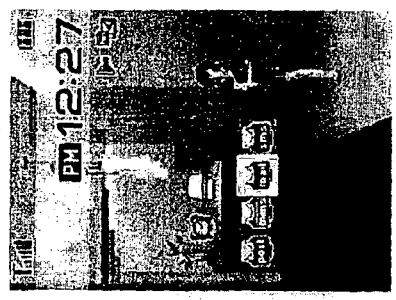
[856]
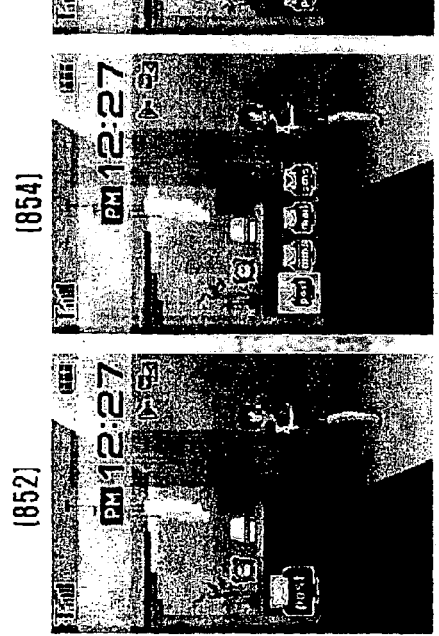
[852] [854]
[858] [860]
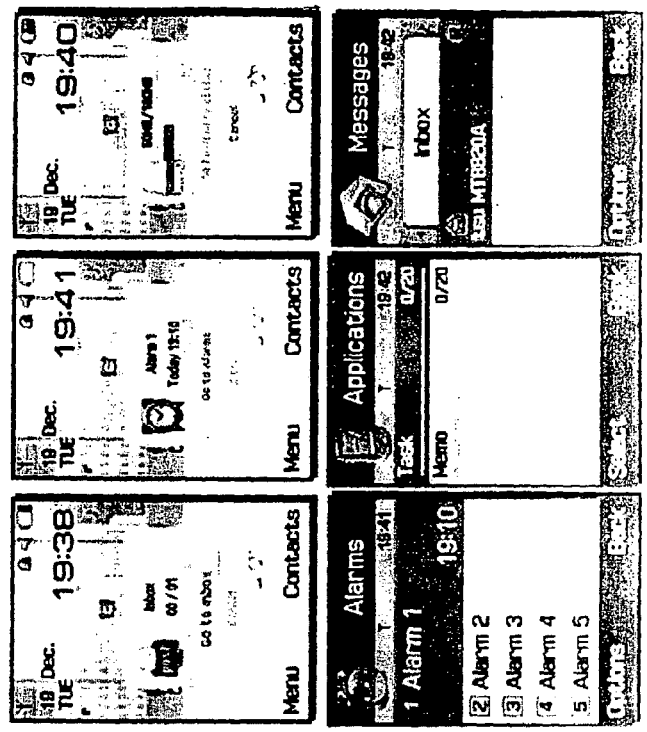
[870]
[875]

SCREEN IMAGE PRESENTATION APPARATUS AND METHOD FOR MOBILE PHONE

CROSS-REFERENCE TO RELATED APPLICATION

This application claims the benefit under 35 U.S.C. §119(a) of Korean Patent Application No. 10-2005-0118428, filed Dec. 6, 2005 in the Korean Intellectual Property Office, the entire disclosure of which is hereby incorporated by reference.

BACKGROUND OF THE INVENTION

1. Field of the Invention

The present invention relates to a portable phone. In particular, the present invention relates to an idle mode screen image presentation apparatus and method for a mobile phone.

2. Description of the Related Art

Generally, the term portable terminal denotes a cordless electronic device, especially devices represented as mobile phones. Recent mobile phones have been implemented with various functions in addition to basic voice communication functions. Such phones include a camera phone equipped with a camera module, a digital TV phone equipped with a Digital Multimedia Broadcast (DMB) or Digital Video Broadcast (DVB) module, and an MP3 phone equipped with an MPEG-1 Audio Layer 3 (MP3) module. That is, the mobile phone has developed into a multipurpose electronic device.

Typically, an advanced mobile phone having an advanced multimedia processing ability is provided with a liquid crystal display (LCD) to display multimedia data. In order to effectively display information, various screen display techniques have been researched and developed. That is, screen display schemes have been designed to support viewing multimedia data while simultaneously displaying information related to a basic task. For example, a mobile phone can be implemented to display a preset image while the mobile phone is in an idle state. In this case, the image of the idle screen view is downloaded from a website or taken by an integrated camera.

However, conventional mobile phones limit designs for a screen image to be presented on the display. Although there have been screen image design methods in which the screen image is designed with a background image, text, and clock selected by a user, most of the conventional screen image design techniques do not enable the design of a dynamic screen image with various character images.

Accordingly, a need exists for a system and method for creating and implementing screen images for devices such as mobile terminals.

SUMMARY OF THE INVENTION

Exemplary embodiments of the present invention have been made in an effort to address the above and other problems, and it is an object of exemplary embodiments of the present invention to provide a screen image presentation apparatus and method for a mobile phone that are capable of building a screen image having features, such as a character house with function items for notifying a user of functions of the mobile phone.

It is another object of exemplary embodiments of the present invention to provide a screen image presentation apparatus and method for a mobile phone that are capable of building a screen image having a background image and a character house with function items notifying a user of functions of the mobile phone.

It is another object of exemplary embodiments of the present invention to provide a screen image presentation apparatus and method for a mobile phone that are capable of presenting, when one of the function items of a character house provided on a screen image is selected, detailed information on the selected function item in a popup window.

It is another object of exemplary embodiments of the present invention to provide a screen image presentation apparatus and method for a mobile phone that are capable of accessing, when a function item of a character house provided on a screen image is selected, a menu associated with the selected function item.

It is another object of exemplary embodiments of the present invention to provide a screen image presentation apparatus and method for a mobile phone that are capable of grouping function items provided with a character house by similarity of function, and then displaying, when a function item group is selected, individual function items belonging to the selected function item group, and presenting, when an individual item is selected from the selected group, detailed information on the selected function item.

It is another object of exemplary embodiments of the present invention to provide a screen image presentation apparatus and method for a mobile phone that are capable of building a screen image having a character house with a background image, decoration items, movable items, and function items.

It is another object of exemplary embodiments of the present invention to provide a screen image presentation apparatus and method for a mobile phone that are capable of building a screen image having a background that changes according to the passage of time.

In accordance with an aspect of exemplary embodiments of the present invention, the above and other objects are substantially accomplished by providing a screen image presentation apparatus of a mobile phone, comprising a memory which stores a character house including a background and function items for executing functions of the mobile phone, a controller which presents the character house in an idle mode of the mobile phone and provides information, when one of the function items is selected, on a function associated with the selected function item, and a display which displays the character house under the control of the controller.

According to exemplary embodiments of the present invention, the controller presents, if a function item is selected, a menu window listing menu options associated with a function represented by the function item.

According to exemplary embodiments of the present invention, the controller presents, if the function item is selected, a function item image and information associated with a function represented by the function item in the form of a popup window.

According to exemplary embodiments of the present invention, the function item includes a message box item for informing a user of a number of unread message, an alarm clock item for informing a user of scheduled alarm times, and a memory monitor item for informing a user of memory utilization.

According to exemplary embodiments of the present invention, the function items include single function items of which each represents a function of the mobile phone, and multifunction items of which each represents a grouping of a plurality of single function items.

According to exemplary embodiments of the present invention, the controller presents, if one of the multifunction items is selected, all of the single function items grouped in the multifunction item, and presents, if one of the single function items is selected, a function item image and information associated with a function represented by the function item in the form of a popup window.

According to exemplary embodiments of the present invention, the multifunction items include a message box item which groups a text message item, an email message item, and a multimedia mail item.

According to exemplary embodiments of the present invention, the multifunction items include an alarm clock item which groups a scheduler item and a to-do item.

According to exemplary embodiments of the present invention, the character house further includes at least one motion item which can move along a preset movement line in the character house, and at least one decoration item which can be fixedly arranged at a predetermined position in the character house for decorating the character house.

According to exemplary embodiments of the present invention, the background includes a plurality of background images presented for reflecting different times of a day.

In accordance with another aspect of exemplary embodiments of the present invention, the above and other objects are accomplished by providing a screen image presentation method of a mobile phone, comprising presenting a character house including a background and at least one function item, and presenting, when the function item is selected, information on a function represented by the function item together with a function item image.

According to exemplary embodiments of the present invention, the screen image presentation method further includes presenting, when the function item is selected while the information on the function is presented, a menu associated with the function item.

According to exemplary embodiments of the present invention, the information on the function and the function item image are presented in the form of a popup window.

According to exemplary embodiments of the present invention, the function item includes a message item for informing a user of unread messages wherein informing a user of unread messages includes checking unread messages if the message item is selected, presenting, if at least one unread message exists, a number of the unread messages in the form of a popup window together with the message item, and presenting, if the message item is selected while the number of the unread message are presented, a menu for inspecting the unread messages.

According to exemplary embodiments of the present invention, informing a user of unread messages further includes highlighting the message item if at least one unread message exists before presenting the number of the unread messages in the form of the popup window.

According to exemplary embodiments of the present invention, the function item includes an alarm clock item for informing a user of scheduled alarms wherein informing a user of scheduled alarms includes checking scheduled alarms if the alarm clock item is selected, presenting, if at least one scheduled alarm exists, an alarm scheduled at a closest time in the form of a popup window together with the alarm clock item, and presenting, if the alarm clock item is selected while the alarm scheduled at the closest time is presented, a menu for inspecting the scheduled alarms.

According to exemplary embodiments of the present invention, informing a user of scheduled alarms includes animating the alarm item, if at least one scheduled alarm exists, before presenting the alarm scheduled at the closest time in the form of the popup window.

According to exemplary embodiments of the present invention, the function item includes a memory monitor item for informing a user of memory utilization wherein informing a user of memory utilization includes checking total memory capacity and available memory capacity if the memory monitor item is selected, and presenting information on the total memory capacity and available memory capacity in the form of a popup window together with the memory monitor item.

According to exemplary embodiments of the present invention, informing a user of memory utilization further includes animating the memory monitor item, if the memory monitor item is selected, before presenting the information on the total memory capacity and available capacity in the form of the popup window.

According to exemplary embodiments of the present invention, the function items include single function items of which each represents a function of the mobile phone, and multifunction items of which each represents a grouping of a plurality of single function items.

According to exemplary embodiments of the present invention, presenting information on a function represented by the function item together with a function item image includes presenting, if one of the multifunction items is selected, all of the single function items grouped in the multifunction item, and presenting, if one of the single function items is selected, a function item image and information associated with a function represented by the function item in the form of a popup window.

According to exemplary embodiments of the present invention, the multifunction items include a message box item which groups a text message item, an email message item, and a multimedia mail item, and presenting message items including presenting the text message, email message, and multimedia mail items, if the message box item is selected, checking, if one of the items constituting the message item is selected, unread messages of a selected item, presenting, if there is at least one unread message, a number of unread messages of the selected item in the form of a popup window together with the selected item, and presenting, if the item is selected while the number of the unread message is presented, a menu for inspecting the messages.

According to exemplary embodiments of the present invention, the multifunction items include an alarm clock item which groups a scheduler item and a to-do item, and presenting of the alarm clock item includes presenting the scheduler item and the to-do item if the alarm clock item is selected, checking, if one of the items is selected, scheduled alarms of the selected item, presenting, if there is at least one schedule alarm, information on the scheduled alarms in the form of a popup window together with the selected item, and presenting, if the item is selected while the information on the scheduled alarm is presented in the form of the popup window, a menu for inspecting the scheduled alarms.

According to exemplary embodiments of the present invention, the character house further includes at least one motion item which can move along a preset movement line in the character house, and at least one decoration item which can be fixedly arranged at a predetermined position in the character house for decorating the character house.

According to exemplary embodiments of the present invention, the background includes a plurality of background images presented for reflecting different times of day.

BRIEF DESCRIPTION OF THE DRAWINGS

The above and other objects, features and advantages of exemplary embodiments of the present invention will become more apparent from the following detailed description in conjunction with the accompanying drawings, in which:

FIGS. 2A to 2C are views illustrating a character house of a screen image presentation apparatus according to an exemplary embodiment of the present invention;

FIG. 7A is screen images illustrating a character quotient module on an idle mode screen in a screen image presentation technique according to an exemplary embodiment of the present invention;

FIG. 8 is a drawing illustrating a table of emotions to be displayed with the quotient module of FIG. 7B according to an exemplary embodiment of the present invention;

FIGS. 10A to 10C are views illustrating steps of presenting motion items in a screen image presentation technique according to an exemplary embodiment of the present invention;

FIGS. 11A to 11C are views illustrating steps of presenting decoration items in a screen image presentation technique according to an exemplary embodiment of the present invention;

FIG. 12 shows screen images illustrating character behaviors in a screen image presentation technique according to an exemplary embodiment of the present invention;

FIG. 13 is a screen image illustrating a character animation with an event in a screen image presentation technique according to an exemplary embodiment of the present invention;

FIG. 27 shows screen images illustrating steps of presenting function items grouped in a multifunction item of FIG. 24 according to an exemplary embodiment of the present invention.

Throughout the drawings, like reference numerals will be understood to refer to like parts, components and structures.

DETAILED DESCRIPTION OF EXEMPLARY EMBODIMENTS

Figure 1:
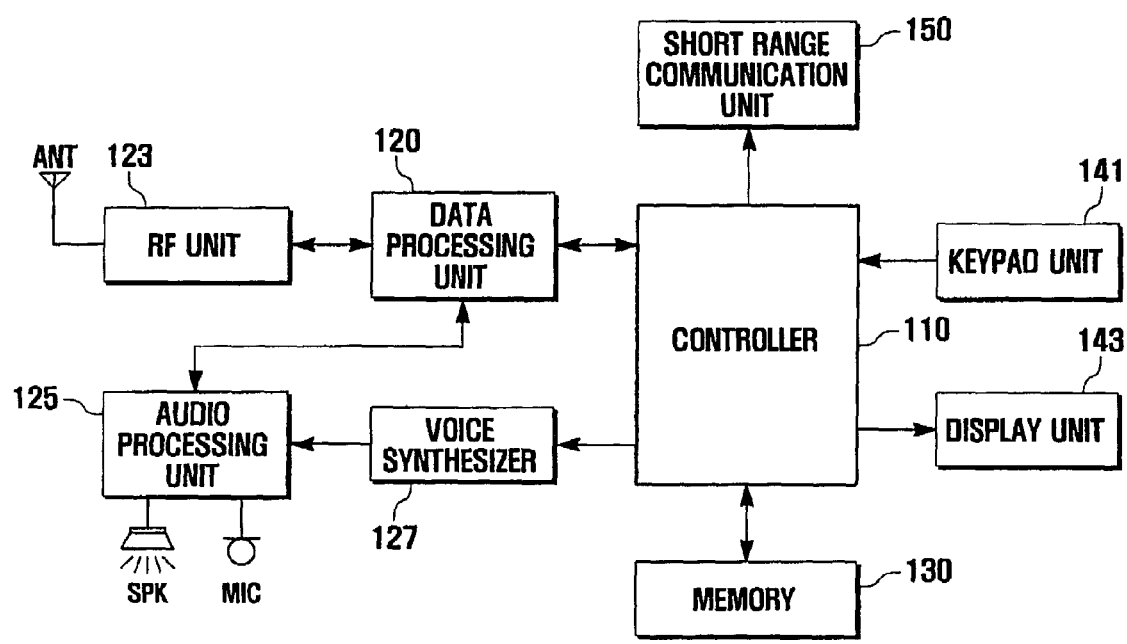
FIG. 1 is a block diagram illustrating a configuration of a mobile phone employing a screen image presentation apparatus and method according to an exemplary embodiment of the present invention.

Exemplary embodiments of the present invention are described herein with reference to the accompanying drawings. The same reference numbers are used throughout the drawings to refer to the same or like parts. Detailed descriptions of well-known functions and structures incorporated herein are omitted to avoid obscuring the subject matter of the present invention in unnecessary detail.

The same or similar elements in the drawings are designated by the same reference numerals although they may be shown in different drawings.

The following definitions are provided to enable a clear and consistent understanding of the detailed description and the claims. Unless otherwise noted, terms are to be understood according conventional usage by those skilled in the relevant art.

A "screen image" is an image presented on a display screen of the mobile phone.

A "house," "avatar house," and "character house" are used interchangeably to refer to a visible object presented on screen in a specific mode of the mobile phone. The house can be displayed with characters, items and backgrounds.

An "Item" is a visible object for enriching the house and includes decoration items, function items for notifying a user of the states of specific functions, and motion items that can move along preset paths.

A "Background" is an image for forming background graphics of the house.

A "Character" is a visible object that can reside in the character house and can express a state of the mobile phone in an emotional manner. The character includes fictional characters represented by a human, avatar, animal, and so forth, that can express various emotions. Accordingly, the character can be configured to express such emotions with, for example, character motions.

In exemplary embodiments of the present invention, the character house can be correlated with a background, a character, and at least one item.

FIG. 1 is a block diagram illustrating a configuration of a mobile phone employing a screen image presentation apparatus and method according to an exemplary embodiment of the present invention.

Referring to FIG. 1, the mobile phone comprises a controller 110, a data processing unit 120, a radio frequency (RF) unit 123, an audio processing unit 125, a voice synthesizer 127, a memory 130, a keypad unit 141, and a display unit 143. The mobile phone can further comprise an antenna ANT, a speaker SPK, and a microphone MIC. The mobile phone can still further comprise a short range communication unit 150.

The RF unit 123 enables the mobile phone to communicate with other terminals over a wireless channel. The RF unit 123 includes an RF transmitter for up-converting and amplifying the frequency of a transmitted signal, and an RF receiver for low-noise amplifying a received signal and down-converting the frequency of the received signal.

The data processing unit 120 includes a transmitter for coding and modulating the transmitted signal, and a receiver for demodulating and decoding the received signal. The data processing unit 120 can include a modem and a codec. The voice synthesizer 127 performs a function of converting a text message output from the controller 110 or received from outside, into a voice signal.

The keypad unit 141 can be provided with a plurality of alphanumeric keys for inputting data, and function key for setting various functions.

The memory 130 can include a program memory and a data memory. The program memory stores programs for processing incoming and outgoing calls, and programs for presenting the character house for a specific state of the mobile phone and controlling reactions of the characters in response to events resulting from the operations of the mobile phone, and for structuring the screen image having the character house with the characters, according to an exemplary embodiment of the present invention.

The data memory includes a character memory for storing character images and information on the characters for implementing exemplary embodiments of the present invention, and a text memory for storing text data for emotional expressions of the characters. The data memory also temporarily stores data generated while the programs are executed.

The term "character house image" is interchangeably used herein to refer to the screen image presented in a specific mode of the mobile phone. The specific mode or specific state can refer to the idle mode or idle state.

The character memory can include a character storage for storing information on the structures of the characters and images thereof, a item storage for storing information on the structures of the items and images thereof, a background storage for storing background images, and a character storage for storing information on the structures of the character houses and images thereof. The character house structure can be stored in the form of information on a combination of the character, item and background image, and the images stored in respective storage can be used individually.

A character is provided with information on character animations expressing emotional states for the mobile phone, character images for expressing emotions in response to text messages (for example, SMS, EMS, MMS, and so forth), and character images for expressing emotions in response to events occurring in the mobile phone. In exemplary embodiments of the present invention, it can be assumed for example, that a plurality of character images can express the emotional states for the mobile phone, a plurality of character images can express the emotions in accordance with the contents of the text messages, and a plurality of character images can express the emotions in accordance with the events occurring in the mobile phone.

The memory for storing the images operates in a file structure. A character file structure includes a header and character images, and the header contains information on identifiers, start delimiters, a number of images, display positions, names of animations, and so forth. In a character transmission mode, the headers and character images are transmitted after being processed in the form of a transmission file.

The character house is displayed on the screen together with a background image, a character, and at least one item in a specific mode (for example, an idle mode) of the mobile phone. That is, the character house is designed by arranging the items on the background image for a specific mode screen (for example, an idle mode screen), wherein the items and the background images are selected by the user. At this time, the file structure of the character house can include a header and a plurality of images, and the header can include a header of the character house and the item headers of the items associated with the character house. The character house header contains information on the character house identifier, the positions of the characters on the screen, the sizes of the characters, and the names of the characters, and each item header contains information on the item index, the position of the item in relation with the character house, and the name of the item. In an exemplary character house transmission mode, the headers of the character house and the items associated with the character house and the background and item images are transmitted in the form of a compressed file.

The items denote images presented in association with the character house on the screen. Each item can be displayed in a specific association with the character house or presented regardless of aspects of the character house. In the case wherein the item is not associated with the character house, the item should be transmitted individually. The item includes a header and an image, and the item header contains information on the item index, the position of the item in relation with the character house, and the name of the item. In the case wherein the item is not associated with the character house, the information on the position of the item has a default value.

In an exemplary embodiment of the present invention, the character is used for presenting the information on the states and event occurrences of the mobile phone, and the character house is used for indicating the specific operation mode (for example, the idle mode) of the mobile. The item is used for showing the functions of the mobile phone, decorating the character house, and showing the screen dynamic. The background image is used for providing a background of the characters and items associated with the character house.

The controller 110 controls general operations of the mobile phone. The controller 110 can be integrated with the data processing unit 120. That is, the controller 110, data processing unit 120, audio processing unit 125, and voice synthesizer 127, can be integrated into a mobile station modem (MSM) chip. In an exemplary embodiment of the present invention, the controller 110 controls operations of the mobile phone to select the characters, items, background image, character house, texts, and sounds, arrange the selected images and texts at the present positions on the screen of the display unit 143, and output the text as voice sounds under the support of the voice synthesizer 127.

The display unit 143 displays the state of the mobile phone under the control of the controller 110. The display unit 143 can be implemented with a liquid crystal display (LCD) together with a LCD controller, memory for storing the display data, and an LCD display device. In the case wherein the display unit 143 is implemented with a touchscreen function, the display unit 143 can operate as an input device with, or replacing the keypad unit 141.

The characters represent a graphical user interface (GUI) including the character displayed on the screen of the display unit 143 in the specific mode of the mobile phone. The character house is a space in which the character having an artificial intelligence resides, such that the user can experience a virtual space with a virtual character who talks and behaves in certain manners. The user can quickly learn the functions of the mobile phone with the assistance of the character house and enjoy the vivid characters.

Exemplary functions of the character house according to exemplary embodiments of the present invention include the following functions and features.

The character house has a function of expressing a dynamic character. First, the character house can express a condition and emotion of a current character in animation, sound and text, according to a character scenario associated with the character. Second, the character house has a function of presenting a background of the screen for a specific mode (especially, the idle mode) of the mobile phone that is changed in accordance with the passage of time. Third, the character house has a function of displaying items. The items, that can be displayed in association with the character house, can be classified by function. In an exemplary embodiment of the present invention, the items can be classified into the following categories, but are not limited thereto. A first category includes exemplary function items for presenting functions and system information on the mobile phone in order to enhance the user's convenience. A second category includes exemplary decoration items for increasing aesthetic satisfaction by adding various images to the character house. A third category includes exemplary motion items that make the character house screen dynamic by adding motion images (for example, a cloud, bird, and so forth).

The character house can further provide a greeting function with which the character associated with the character house gives greetings with appropriate sounds at preset times. An additional function such as allowing a user to give a present to the character can also be implemented.

Figure 2B:
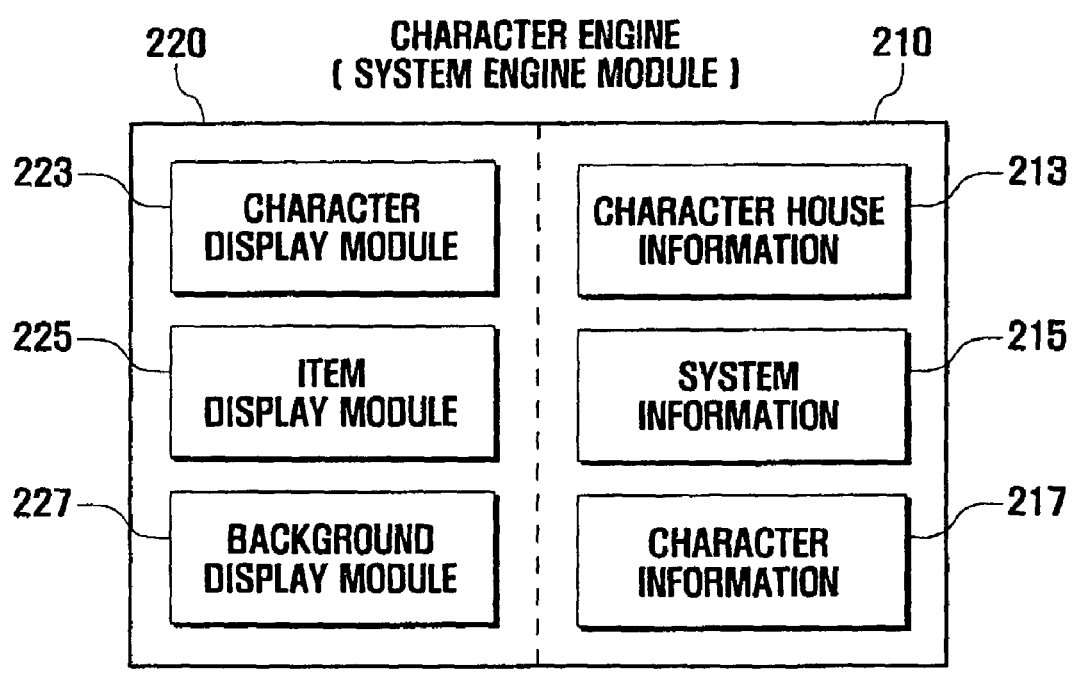
Figure 2C:

FIGS. 2A to 2C are views illustrating a character house of a screen image presentation apparatus according to an exemplary embodiment of the present invention.

FIG. 2A shows an exemplary house setting screen for selecting a character house to be displayed on the screen. The house setting screen is displayed on the screen under the control of a character setting program. If the character setting program is executed, multiple character house images (for example, four images as shown in FIG. 2A) are displayed in corresponding tiled windows on the screen of the display unit 143. When a number of the character house images are less than four, the windows that are not allocated for the character house image can be shown empty.

If a character house is selected from the house setting screen, the controller 110 operates a character engine which is structured as shown in FIG. 2B. Upon being activated, the character engine stores information of the selected character house into a character house information storage module 210 and executes a character house expression module 220. That is, the character engine includes the character house information storage module 210 and the character house expression module 220. The character house information storage module 210 is a module for storing information on the character houses and the character to be displayed in association with each. In an exemplary embodiment of the present invention, the character house information storage module 210 comprises character house information storage 213, system information storage 215, and character information storage 217.

The character information storage 217 stores emotion information, status information, quotient information, and text and sound information associated with the emotions and status of the character. The character information storage 217 also stores animation information for animating the character in a specific status. The mobile phone processes various events occurring while operating, and updates the quotients of the character correspondingly to the events.

The quotient information includes a physical quotient (HQ), an emotion quotient (EQ), an intelligent quotient (IQ), and a social quotient (SQ), that are used for determining the status and emotion of the character. The controller 110 accumulates the quotients associated with the events whenever an event is processed, and determines the status of the mobile phone on the basis of the quotient analysis results. The emotion of the character is determined according to the quotients and the user's feedback analysis results. The emotion of the character can be determined in accordance with a content related to the event (for example, a text message) that is obtained during the process. The text and sound information associated with the emotion can be stored together with the character expression. The character information storage 217 includes information on the animation of the character that is expressed in a specific mode (for example, an idle mode) of the mobile phone.

The system information storage 215 stores system information on the function items for displaying a memory capacity of the mobile phone, scheduled alarms, unread mail items, and so forth. The items associated with the character house include the decoration items, motion items and function items. The function items present the operations and functions of the mobile phone. In this embodiment, the items for presenting a memory status, preset alarm times, and a number of unread mail items, are described as examples of the function items, but embodiments of the present invention are not limited thereto.

The character house information storage 213 stores the information on the character houses that are defined by a character house setting program such that the character house information includes the types and positions of the items and the type of the background associated with the character house. The character house information storage 213 stores the information on the character house images, except for the character and the function items. Thus, the character house information storage 213 stores the information on the decoration items, motion items, and the background images.

The character house expression module 220 comprises a character display module 223, an item display module 225, and a background display module 227.

The character display module 223 renders the character animation of the character house. The character display includes a mobility and entrance of the character, and a text balloon or sound effect associated with the behavior of the character. The character display module 223 can make the character express special motions such as a greeting motion.

The item display module 225 displays the items at preset positions with reference to the character house information on the current character house and the system information. The items are displayed in a different manner by item category (for example, decoration, motion and function).

The background display module 227 displays the background image in accordance with the information stored in the character house information storage 213. The background image can be configured such that the brightness of the background image changes according to the passage of time.

FIG. 2C shows an exemplary character house screen displayed by the character engine of FIG. 2B. The character house is displayed in a specific mode (for example, an idle mode) of the mobile phone and includes a character, items and a background.

Figure 3:
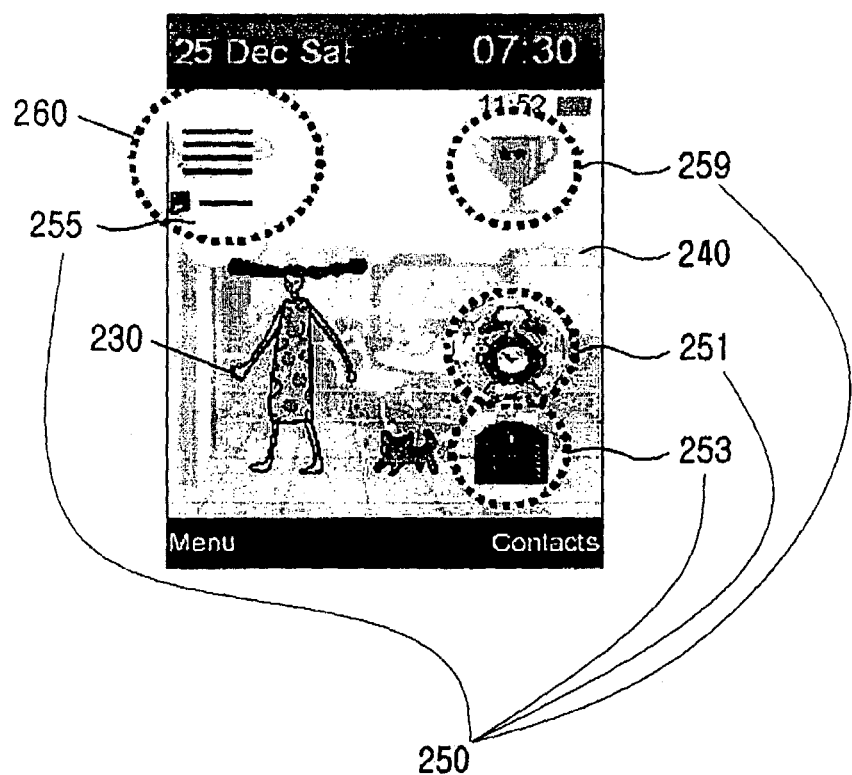
FIG. 3 is a screen image illustrating a character house according to an exemplary embodiment of the present invention.

FIG. 3 is a screen image illustrating a character house according to an exemplary embodiment of the present invention. The character house screen provides information on the detailed status, which is not provided with a normal idle mode screen, for the mobile phone, together with decoration effects, as shown in FIG. 3.

Referring to FIG. 3, a character 230 is displayed in the form of an animated character in association with the character house. The character 230 behaves in a preset motion for the idle mode of the mobile phone so as to provide an alarm at preset times in corresponding animation, together with a text and sound effect. The character 230 can be set to animate for giving items as presents for the character house in a random manner.

In order to express the state of the mobile phone and the emotion of the character representing the state of the mobile phone, the character 230 expresses the emotion in the animation according to the state of the mobile phone and an emotion model, together with the sound and text. The background 240 is represented by a background image of the character house and the brightness of the background can be changed in accordance with the passage of time.

The items 250 give effects for decorating the character house and inform the user of exemplary operations of the mobile phone. That is, the function items 251, 253, 255 and 259 decorate the character house and present the status of the preset functions and operations. For example, the function item 251 is a clock item for showing the preset alarm time, and the function item 253 is a mailbox item for showing the number of unread mail items. If a plurality of alarms are set, the closest alarm time is displayed. The function item 255 is a memory monitor item for displaying the state of the memory. The decoration item 259 is an item for decorating the character house. The motion item (not shown) can be activated for decorating the character house.

The character quotient module 260 includes a character quotient (the social quotient (SQ) represented by values assigned for the events related to the communication are shown for example in FIG. 3), a physical quotient (HQ) represented by values assigned for events related to the performance for the mobile phone, an intelligent quotient (IQ) represented by values assigned for an amount of information stored in the mobile phone, and an emotional quotient (EQ) represented by values assigned for events related to the multimedia. The character quotient module 260 can be configured to be fixed at a position or move, such as floating across the screen.

The character 230 can express the state of the mobile phone in an emotional manner by way of an exemplary method described in greater detail below.

The character 230 of the character house has a plurality of basic expression factors. A first factor is an animation factor, which enables the character 230 to express a state and emotion in motion. A second factor is a text factor, which enables the character 230 to express a state and emotion in text. The text can be presented in the form of a text balloon, but is not limited thereto. A third factor is a speech factor, which enables the character 230 to express a state and emotion in a voice or sound effect.

The character 230 can express various states and emotions, and the state and emotion of the character 230 can be determined in accordance with a state decision model algorithm and an emotion mode decision algorithm as a character scenario that is dependent on the variation of quotient values of the character. The decision on the state and emotion mode of the character on the basis of the character scenario is disclosed in greater detail in Korean Patent Application No. 10-2005-0107174, the entire disclosure of which is incorporated herein by reference. The character 230 of the character house expresses the state information and the emotion mode using the character image together with a unique voice effect and text balloon.

The character 230 can be implemented with an animation in which the character 230 moves around the character house and disappears outside the screen and then appears from outside. That is, the character 230 expresses the state and emotion with a motion, sound effect and text, if the time to express the state and emotion has arrived. The state and emotion of the character 230 is expressed for example, when the quotients reach respective threshold values, rather than continuously. However, the character house is always displayed in the specific mode screen. For example, if the mobile phone enters an idle mode, the character house is displayed on the screen. The character house screen disappears when a preset display time has expired or when the mobile phone enters another operation mode. If the character house is displayed in the idle mode, the character 230 expresses the state and emotion in motion and with other animations.

FIGS. 4A to 4H are screen images illustrating steps for implementing exemplary character animations in a screen image presentation technique according to an exemplary embodiment of the present invention, and FIGS. 4I to 4N are screen images illustrating steps of other exemplary character animations in a screen image presentation technique according to an exemplary embodiment of the present invention.

Referring to FIGS. 4A to 4H, the character 230 moves in a preset behavior pattern in the character house. The character 230 appears at a random position on the screen, makes a speech expression and then moves around. If the character house disappears on the screen while the character moves around the character house, the character 230 appears at a random position and repeats the behavior after a predetermined time has elapsed. The motion, sound effect and text, can be selectively disabled. The character house can be expressed through a plurality of steps as follows.

Figure 4A:
FIGS. 4A to 4N are screen images illustrating steps for implementing exemplary character animations in a screen image presentation technique according to an exemplary embodiment of the present invention.
Figure 4B:

As shown in FIG. 4A, if the mobile phone enters the idle mode, the items and background image of the character house are displayed. Next, as shown in FIG. 4B, a character 230 appears at a position in the character house. The character 230 can appear via a fade-in effect, but is not limited thereto. That is, the character 230 can be implemented with an alpha blending technique such that the transparency of the character 230 changes from 100% to 0% gradually. For example, the transparency reduces by 25% per 0.5 second, such that the character 230 is gradually faded in and completely appears in about 2 seconds. The character 230 starts appearing at a random position. The character 230 is preferably implemented so that the character is at a position where the character incompletely appears. That is, the character 230 is configured to appear at a random position but at a position where the character 230 can be completely shown across the border of the screen.

Figure 4C:
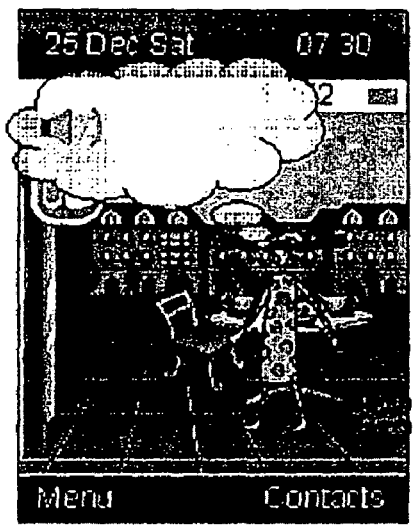

After the character 230 is displayed, a sound effect is output in accordance with the state of the character, with a notification icon, as shown in FIG. 4C. The sound effect is output once and can be repeated one more time when the character reappears. The sound effect can be cancelled.

Figure 4D:

After the sound effect and the text are output, the character 230 is animated as shown in FIG. 4D. The character animation process is repeated until the character 230 disappears. The character animation is performed at a fixed position.

Figure 4E:

As shown in FIG. 4E, after the character animation starts, the state and emotion of the character 230 is expressed with text. The text is expressed in the text balloon in consideration of the time taken for the user to read the text. The text balloon is displayed in the form of a semitransparent image having about 30% transparency, and is open about 3 seconds in consideration of the reading time.

Figure 4F:
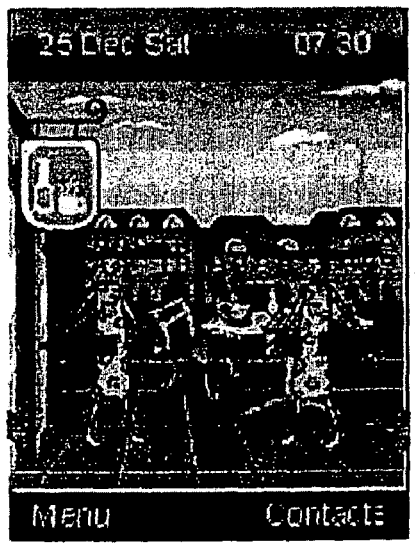
Figure 4G:
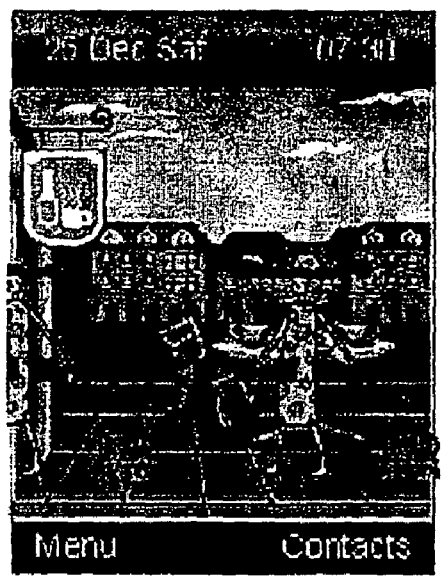
Figure 4H:

After the text balloon disappears, the character 230 moves as shown in FIGS. 4F and 4G. The movement direction of the character 230 can be changed according to the position at which the character 230 appears. That is, the position at which the character 230 appears is checked such that the character 230 moves in a direction to which the character can secure the longest distance for movement. The character 230 moves at a predetermined speed. It is preferred that the character 230 is set to move at the speed about 20 pixels per second, but embodiments of the present invention are not limited thereto. The character 230 disappears across the border of the screen. If the character 230 disappears completely, an initial idle mode screen is displayed as shown in FIG. 4H, substantially identical with the screen of FIG. 4A. After a predetermined time (for example, about 2 seconds) elapses, the steps of FIGS. 4A to 4G are repeated.

Figure 4I:
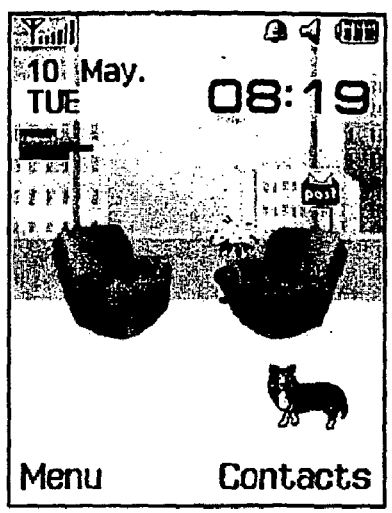
Figure 4J:
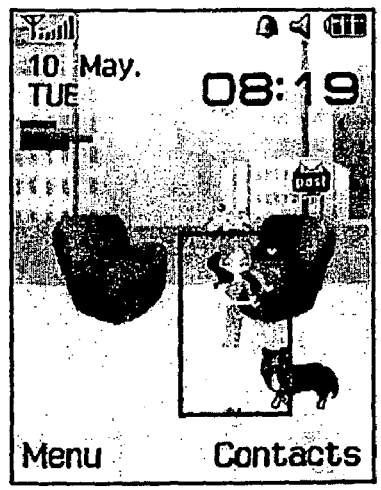

The character animation illustrated in FIGS. 4I to 4N is an example in which the character does not move. Referring to FIGS. 4I to 4N, the character is displayed in the idle mode screen. In the initial state of the idle mode shown in FIG. 4I, the preset items and background image are displayed, but not the character. Next, as shown in FIG. 4J, the character appears on the screen. The character appears at a predetermined position on the screen. The appearance position is changed to the bottom right position in relation with a center of the screen. The appearance position can be changed according to the size of the character. The character can be set to appear via a fade-in effect in such a manner that the transparency of the character changes from 100% to 0% gradually. For example, the transparency can be reduced by about 25% per 0.5 second, such that the character is gradually faded in and completely appears in about 2 seconds.

Figure 4K:

After the character 230 is completely displayed, a sound effect is output in accordance with the state of the character, with a notification icon as shown in FIG. 4K. The sound effect is output once and can be repeated one more time when the character reappears.

Figure 4L:

Next, text is displayed for expressing the current state and emotion of the character as shown in FIG. 4L. The text is presented in a text balloon having a transparency of about 30%. The text can be displayed in synchronization with a sound. The text balloon is expressed in consideration of time taken for the user to read the text. For example, the text balloon can be set to disappear after about 1.5 seconds.

Figure 4M:
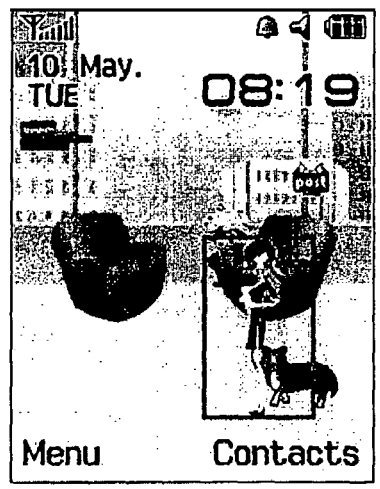
Figure 4N:
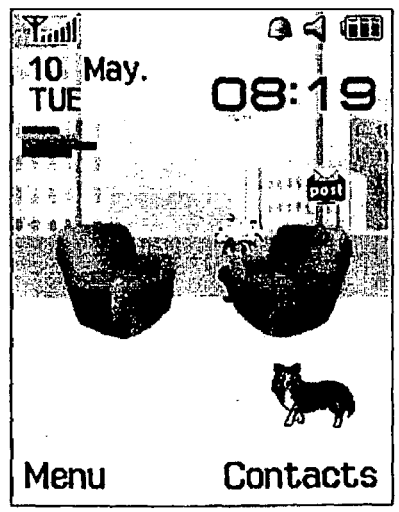

After the sound effect ends and the text balloon disappears, the character is animated as shown in FIG. 4M. The character animation process is repeated until the character disappears in the character house as shown in FIG. 4N.

As described above, the character animation process is performed in such an order that the items 250 and background image 240 are displayed, the character 230 appears via a fade-in effect, the sound effect is output for notifying the user of a state of the mobile phone, the text is presented for notifying the user of a state of the mobile phone, and the character animation is performed in the character house.

The character animation denotes a motion behavior of the character without moving around the screen, and the character movement denotes a behavior of the character moving around the screen. The character animation and the movement can be performed separately or at the same time. The character 230 can also appear with the items 250 and the background separately or at the same time. Still further, the character 230 can appear in the form of an opaque object, i.e. with a 0% transparency, or having any transparency value desired. In yet other exemplary embodiments of the present invention, the steps of outputting the sound effect and/or the text can be skipped.

The background of the character can be presented by way of an exemplary method described in greater detail below. The presentation of the background can be performed such that the background image changes according to the passage of time. A fixed background image can also be used.

Figure 5A:
FIGS. 5A to 5C are screen images illustrating steps for implementing an animated background in a screen image presentation technique according to an exemplary embodiment of the present invention.
Figure 5B:
Figure 5C:
Figure 6:
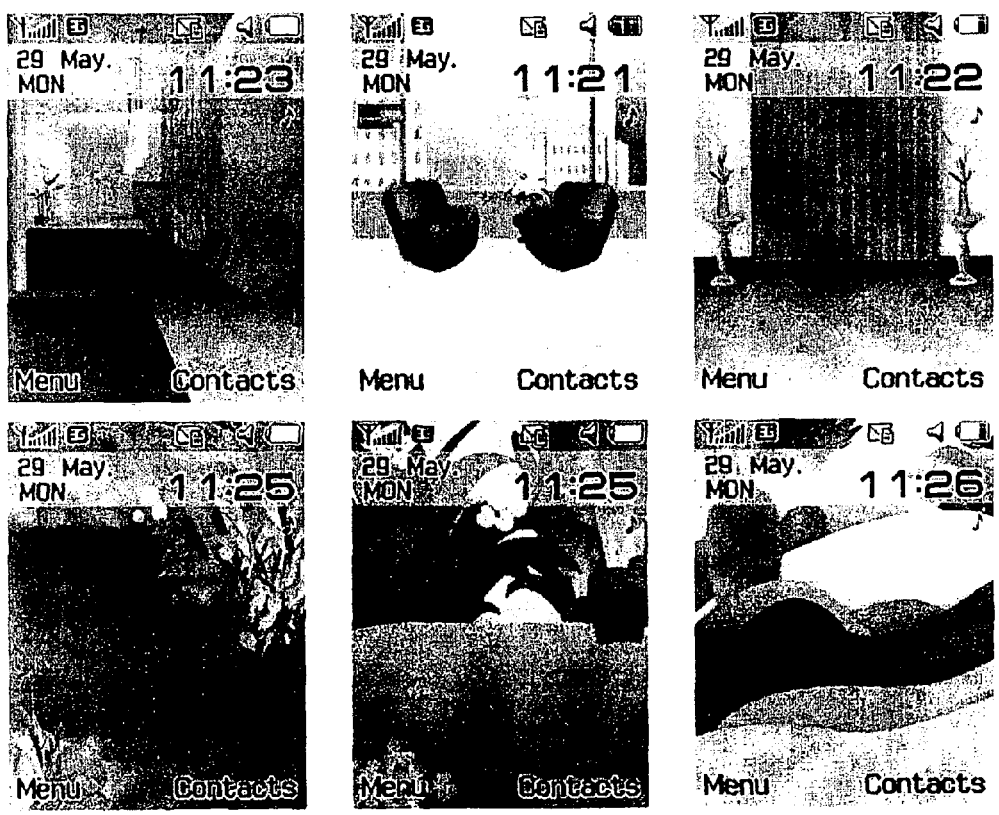
FIG. 6 shows screen images illustrating background images for implementing an animated background in a screen image presentation technique according to an exemplary embodiment of the present invention.

FIGS. 5A to 5C are screen images illustrating steps for implementing an animated background in a screen image presentation technique according to an exemplary embodiment of the present invention, and FIG. 6 shows screen images illustrating background images for implementing an animated background in a screen image presentation technique according to an exemplary embodiment of the present invention. The background images of FIG. 6 can be used for the animated background and/or the fixed background.

Referring to FIGS. 5A to 5C, the animated background is implemented with several background images that are presented in series according to the passage of time. In an exemplary embodiment of the present invention, a day is divided into a plurality of time periods, i.e. morning, afternoon, evening, and night, and the background is provided with different background images for the respective time periods. In such an exemplary embodiment, if an animation background 240 is set by the user, the background images of the character house changes according to the time periods of the day. Since the change of the background is performed in accordance with the passage of time, the background of the character house is changed to have different brightness background images assigned for the morning, day and night, as shown in FIGS. 5A to 5C. In an exemplary embodiment of the present invention, the time periods of the day are defined as shown by way of example in the following Table 1. In this case, the character can be set to give greetings corresponding to the time periods, for example, whenever each time period starts.

TABLE 1

| Class | Time Period | Description |
| --- | --- | --- |
| Morning | 06:00~12:00 | A slightly bright image having sunshine. |
| Afternoon | 12:00~18:00 | A warm image having a sun in the middle of the sky. |
| Evening, Night | 18:00~06:00 | A dark image with no sun, and/or moonlight and starlight only. |

The background can be set on the character house setting screen. FIG. 6 shows the background images that can be selected for the background. The background images can be used for the animated background in which background images are changed in accordance with the time period and/or can be used for a fixed background. That is, the background images can be used for the animated background of the character house and/or can be used for the fixed background of the character house. Each background image can be used for the animated background by changing the brightness of the background image for expressing the time periods.

The information of the character house and items 250 can be presented by way of an exemplary method described in greater detail below. The character house can present information on items showing the system information and the quotients of the character, as well as the character 230 and the background 240.

First, an exemplary method to present the character quotient module will be described, and then an exemplary method to present the item 250 will be described.

Figure 7B:
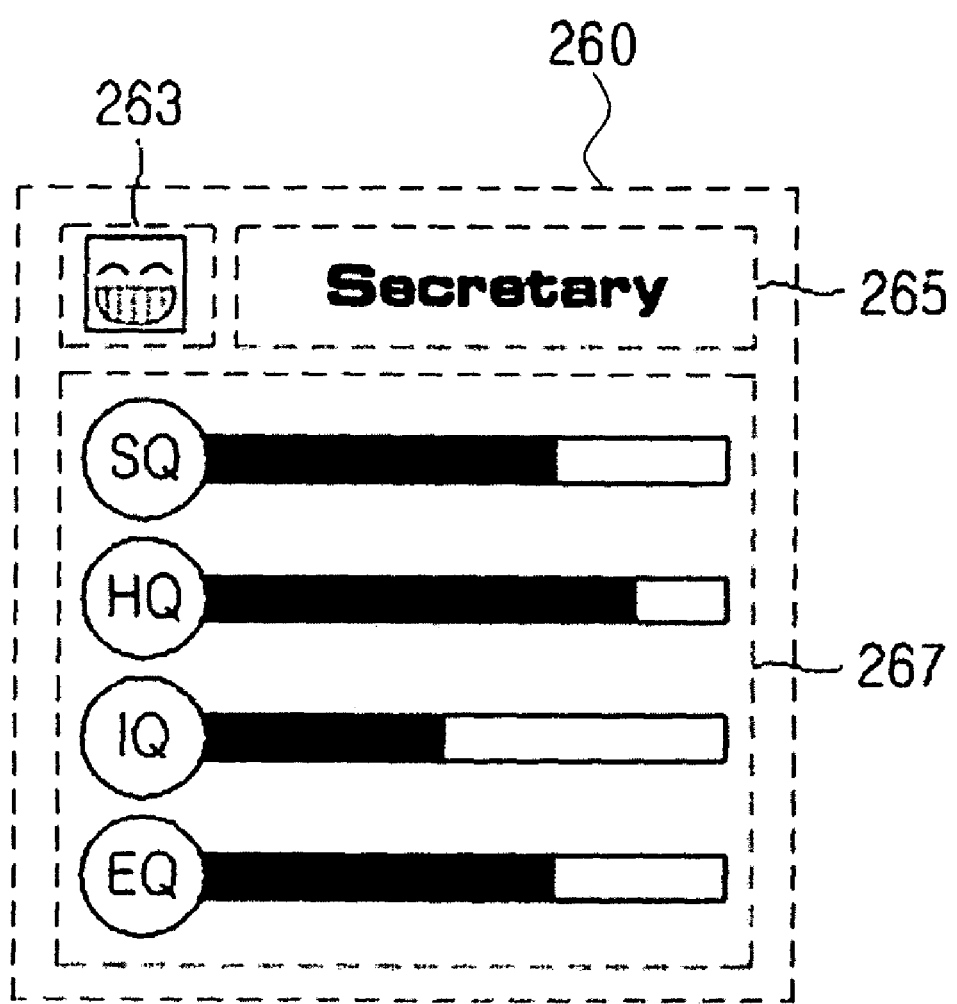
FIG. 7B is an enlarged view illustrating the character quotient module of FIG. 7A according to an exemplary embodiment of the present invention.

FIG. 7A is screen images illustrating a character quotient module on an idle mode screen in a screen image presentation technique according to an exemplary embodiment of the present invention, and FIG. 7B is an enlarged view illustrating the character quotient module of FIG. 7A.

Referring to FIGS. 3 and 7A, the character quotient module 260 notifies the user of the current status of the character 230, and can be presented in various manners. In an exemplary embodiment of the present invention, the character quotient module 260 shows the state and emotion of the character 230 with the HQ, EQ, IQ and SQ status gauges. Since the state and emotion of the character are presented with the quotient status gauges, the character can attract the user's interest.

The character quotient module 260 can be presented at a preset position in the character house or as described above, can be free to move. In an exemplary embodiment of the present invention, the character quotient module is presented at the top left area of the screen, as shown in FIG. 7A. The character quotient module 260 can be set to be visible or invisible according to a user selection.

Referring to FIG. 7B, the character quotient module 260 comprises a quotient information display region 267, an emotion icon display region 263, and a status display region 265. The emotion icon display region 263 can be implemented to display emotions representing the emotions of the character, the status display region 265 presents the status of the character in text, and the quotient information display region 267 displays the levels of the quotients with, for example, color bars (gauge).

The emotions that can be presented in the emotion icon display region 263 include "happy", "normal", "angry", "sad" and "tired", and the emotions are linked to corresponding images in the form of a table as shown in FIG. 8. Accordingly, when implementing a character house, the emotion of the character can be presented by the emotion of the character quotient module corresponding to the current emotion of the character in addition with the character animations.

The status information of the character can be presented at the status display region 265 in the form of text. Each character can have various statuses that can be expressed in the form of text.

The character quotient information is displayed in the form of gauges in the quotient information display region 267. In an exemplary embodiment of the present invention, four quotients, i.e., HQ, EQ, IQ and SQ, are measured and presented in the quotient information display region 267. In order to distinguish the quotients from each other, the quotients can be presented by means of colored gauges, i.e. a red gauge for SQ, a green gauge for HQ, a purple gauge for IQ, and a blue gauge for EQ. Each gauge presents the level of the quotient in a percentage (%) without text based notification. In yet other embodiments of the present invention, the emotion icon display region 263 and a status display region 265 can be deleted.

The item 250 can be presented by way of an exemplary method described in greater detail below.

The items and expressions such as the greetings, can be bought in an item shop on the web or received as a gift. The items that can be presented in the character house include the function items, decoration items and motion items. The positions of the items on the screen can be set in the character house setting screen. The items, that is, the function items, motion items and decoration items, can be presented by way of exemplary methods described in greater detail below.

The function items denote items for providing specific system information of the mobile phone. In an exemplary embodiment of the present invention, the function items include a memory monitor item, an alarm item, and a mailbox item. Additional function items can be added when required. The mailbox item can be a message item, and will be used herein to further describe the function items.

The function items can be implemented for a signal function or can be an item grouping function items having similar functions. As a group-wise function item, the mailbox item can present all kinds of messages. In this case, the function item integrates a short message service (SMS) item, an email message service (EMS) item, and a multimedia message service (MMS) item. In the case of the alarm item, it can integrate a schedule item, a memo item, alarm generation item, and so forth. If such a multifunction item is selected, the controller 110 can display the function items integrated in the multifunction item such that the user can select one of the items.

FIGS. 9A to 9L are views illustrating steps of presenting function items in a screen image presentation technique according to an exemplary embodiment of the present invention.

Figure 9A:
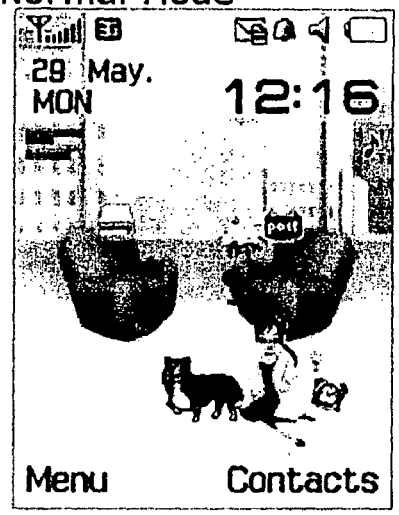
FIGS. 9A to 9L are views illustrating steps of presenting function items in a screen image presentation technique according to an exemplary embodiment of the present invention.
Figure 9B:
Figure 9C:

The functional item can be displayed in a normal mode (as in FIG. 9A), a selection mode (as in FIG. 9B), and an enable mode (as in FIG. 9C). The function item having a single function can be presented by way of an exemplary method described in greater detail below with reference to FIGS. 9A to 9C.

Referring to FIG. 9A, when the function items are presented with the character house, the function items are arranged at the preset positions on the screen. In FIG. 9A, the mailbox item, the clock item, and the memory monitor item, are examples of such items displayed on the screen. In the normal mode, the function items are displayed as basic item images. If an event occurs while the function items are displayed in the normal mode, the basic item image of the function item related to the event is animated. In the normal mode, if an item display mode key (for example, a special key such as a "clear key", provided to the mobile phone) is input, the mobile phone enters a selection mode for displaying the function item information.

Referring to FIG. 9B, the function items are displayed with a semitransparent layer in the selection mode, and a zoom function is used to display the selected item in an enlarged form. In the selection mode, other function items can be selected by keypad or touchscreen manipulation. If an OK key is input while an item is selected, the item is activated in the enable mode.

Referring to FIG. 9C, upon entering the enable mode, the item image of the selected function item is displayed together with the information on the selected function item. By manipulating the up/down direction keys provided in the keypad unit or on a touchscreen, it is possible to navigate to other applets or return to the normal mode shown in FIG. 9A. Left/right direction keys allow navigating to and activating other function items.

An exemplary structure and presentation of a function item will now be described with the memory monitor item as an example with reference to FIGS. 9D to 9F.

The memory monitor item is a function item for displaying memory utilization information. FIG. 9D shows a memory monitor item image in the normal mode. If the memory usage is over 50% in the normal mode, the memory monitor item is animated as shown in FIG. 9E. If the memory monitor item is selected by the keypad manipulation or touchscreen, the memory monitor item is displayed on the screen in the form of an enlarged memory monitor item image presenting the memory utilization with text and a gauge.

The memory utilization information is displayed in text form to describe a used memory/total memory. Also, the memory utilization information is presented with a colored bar of a gauge. The gauge bar can be placed in the left or right side of the memory monitor item according to the position of the memory monitor item on the screen, and can change color (for example, from green to red) if the memory utilization percentage exceeds a predetermined percentage (for example, 95%). If a "go to memory status" command is input through a menu screen, a detailed memory utilization screen is displayed for informing the user of the usage of the memory as shown in FIG. 9F.

An exemplary structure and presentation of a function item will now be described with the clock item as an example with reference to FIGS. 9G to 9I.

The clock item is a function item for alarming a user at preset times. FIG. 9G shows the clock item image in the normal mode. If a preset time has arrived, the clock item is animated as shown in FIG. 9H. If the clock item is selected by the keypad manipulation, the clock item is presented on the screen in the form of an enlarged clock item image with the present time. The preset time can be presented in the form of text and an image. The preset time can be for "morning call", "schedule" and/or "to do" functions.

The text can be presented in various formats. For example, a first text format can be used for a title of the schedule and a second text format can be used for date and time. If the schedule title is not set, a default text of "no title" is presented. In the text format, the time is presented in the form of TT/MM, and the date is presented in the form of today/tomorrow/day of the week. The text can be positioned at a left or right side of the clock item according to the position of the clock item on the screen. If multiple schedules are preset, the closest arranged schedule is shown. If a "go to alarm status" command is input through a menu screen, a detailed schedule screen is displayed for informing a user of preset alarm schedule details as shown in FIG. 9I.

Figure 9D:
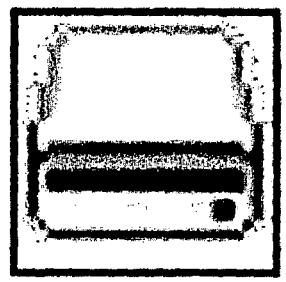
Figure 9E:
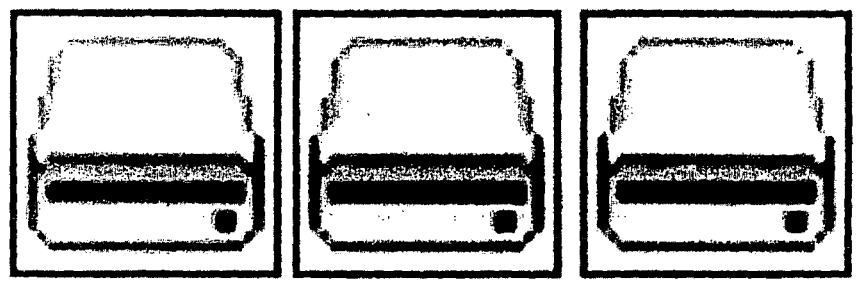
Figure 9F:
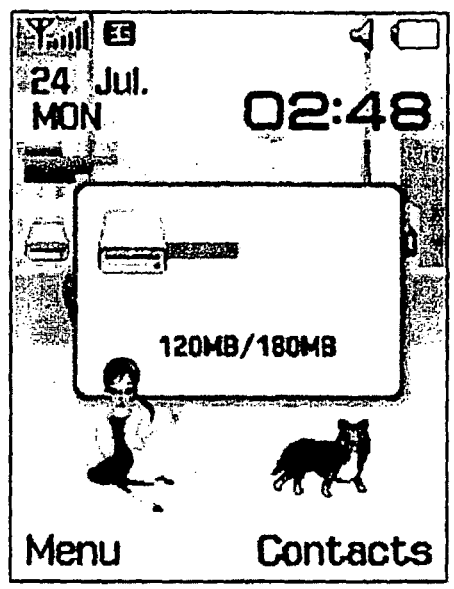
Figure 9G:
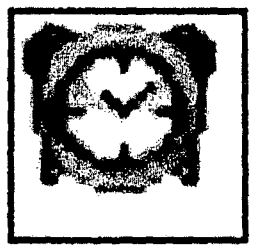
Figure 9H:
Figure 9I:
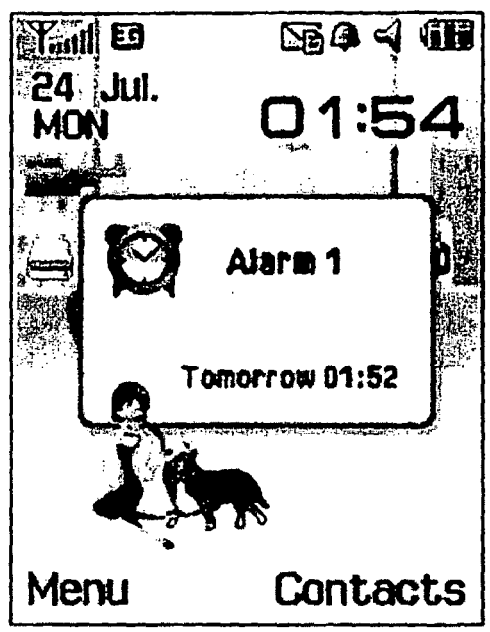
Figure 9J:
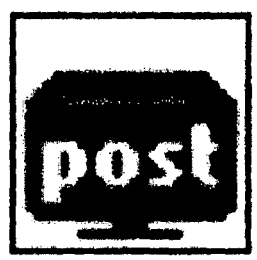

An exemplary structure and presentation of a function item will now be described with the mailbox item as an example with reference to FIGS. 9J to 9L.

The mailbox item is a function item for informing the user of a number of unread messages among the received messages. FIG. 9J shows the mailbox item image in the normal mode. If a message is received in the normal mode, the mailbox item is animated as shown in FIG. 9K. If the mailbox item is selected by the keypad manipulation or touchscreen, the mailbox item is presented on the screen in the form of an enlarged mailbox image with the information on the received and unread messages. The information on the received and unread messages can be presented with text and an image.

The text can be presented in various formats. For example, a first text format can be used for a category of the information (in this case, New Message), and a second text format can be used for the numbers of the messages in the form of "new message/total message". The text can be positioned at a left or right side of the mailbox item according to the position of the mailbox item on the screen. If a "go to inbox" command is input through a menu screen, a message list screen is displayed for showing the received messages as shown in FIG. 9L.

The motion items are items for making the screen presentation of the character house dynamic. The motion items can move around on the screen according to movement lines by item.

Figure 10A:
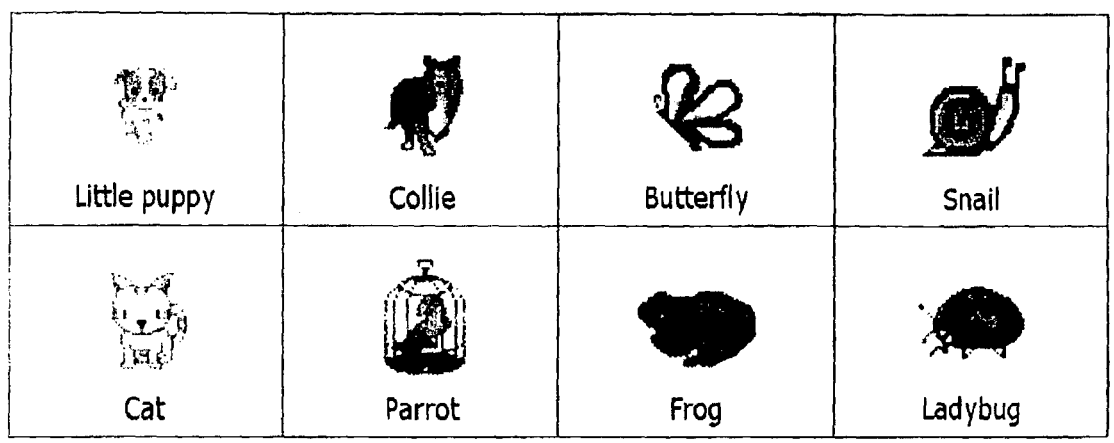
Figure 10B:
Figures 10C, 11A:
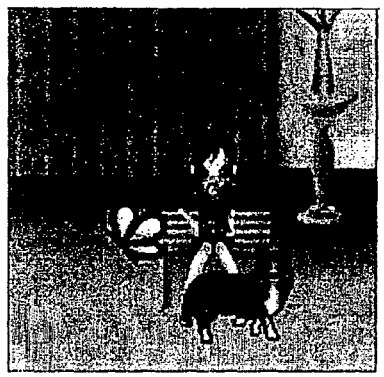

FIGS. 10A to 10C are views illustrating steps of presenting motion items in a screen image presentation technique according to an exemplary embodiment of the present invention.

Referring to FIGS. 10A to 10C, the motion items of the character house include animals and movable objects as shown in FIG. 10A. Each motion item can move in accordance with a unique movement line and at a preset animation times.

The motion items are animated on the basis of the position information contained in the character house information 213 such that each motion item starts moving at the preset time along the preset movement line as shown in FIG. 10B. The motion item can be configured to move at a constant or random speed, and can be configured to randomly turn directions.

As shown in FIG. 10C, when moving across each other, the motion items are overlapped. In such a case, the motion items are shown in an order of presentation priorities (depth) that are preset for the respective items. That is, all of the motion items are assigned presentation priorities such that the motion item having the highest priority is presented when at least two motion items are overlapped while on the move. Some motion items have higher priorities than that of the character, and others have lower priorities. In FIG. 10C, the motion item "collie" (a dog) has a priority higher than that of the character, such that the legs of the character are covered by the collie. Also, a special motion item (a butterfly for example in FIG. 10a) is assigned the highest priority such that it always appears on the character and other items.

As described above, the motion items are animated to move at a speed (for example, 5 pixels/sec) so as to disappear out of the character house (crossing the border of the screen) and then appear after a while. If a motion item encounters the character or other item while moving along the movement line, the motion item or the character having a higher priority is displayed on top. If a motion item having a priority lower than that of the character passes across the character, the motion item is shaded by the character.

The decoration items are objects for decorating the character house such that the decoration items have no special functions. FIGS. 11A to 11C are views illustrating steps of presenting decoration items in a screen image presentation technique according to an exemplary embodiment of the present invention. FIG. 11A shows exemplary decoration items that can be presented for decorating the character house, FIG. 11B shows exemplary character houses decorated with the decoration items, and FIG. 11C shows specific decoration items shown in an enlarged form on the screen.

Referring to FIGS. 11A to 11C, the decoration items to be applied for the character house comprise flowers, furniture, and other ornamental things. Such decoration items can be presented with the character in the character house as shown in FIG. 11B. Some decoration items have special meanings. The special decoration items such as a trophy and a clover shown in FIG. 11C are obtained as a reward for winning a game or achievement of a specific state for the mobile phone and can, for example, be items that are bought with cash. The decoration item "trophy" is used for informing a user of a number of wins of a game, such that every win of the game can change the trophy color and type, and increases the total number of trophies.

The above exemplary methods can be used to present the character 230, the background 240, the items, and the character quotient module 260. Further, in yet other exemplary embodiments of the present invention, the character quotient module 260 can be selectively set to be visible or invisible.

Also, as described above, all of the elements constituting the character house are presented in association with the character house. However, in yet other exemplary embodiments of the present invention, the character house can be set to operate differently at a specific time or situation. For example, the character house can be configured such that the character gives greetings at specific times or when a specific event occurs.

In the case wherein the greeting behavior is set, the character gives the user greetings at the preset times and an item or character money can be given as a reward for the behavior.

FIG. 12 shows screen images illustrating character behaviors in a screen image presentation technique according to an exemplary embodiment of the present invention. As shown in FIG. 12, when the character gives a greeting at a specific time, the greeting expression is displayed in the form of a text balloon, and the greeting expression can change according to the time of day.

The greeting behavior of the character can be configured such that the character gives a greeting at predetermined times of the day (in an exemplary embodiment of the present invention, four times a day). If it is determined that the character gives a greeting four times a day, four greeting time periods are configured: morning (08:30~09:30), afternoon (12:00~13:30), evening (17:30~18:30), and night (23:30~00:30). Accordingly, the character gives a greeting once at each greeting time. If the mobile phone is off or in character house disabled modes at each of the greeting time periods, the greeting behavior is disabled. That is, the mobile phone is not in the idle mode where the character house screen is presented (for example, when a clam shell type phone is unfolded or a slide type phone is slid open), and the greeting behavior function is disabled.

When the greeting behavior starts, the greeting behavior remains active during a predetermined time period (for example, 10 seconds). If a specific event (for example, an incoming call or a key input for activating a specific function) occurs while the character is giving a greeting, it is regarded that the greeting is performed if the greeting behavior is maintained over a predetermined time (for example, 3 seconds). If the greeting behavior stops before the 3 seconds elapses and the character house is activated at the greeting times period, the greeting behavior starts again.

The character is preferably associated with different greeting behaviors for the respective greeting time periods as shown by way of example in Table 2 below.

TABLE 2

| Class | Time Zone | Text |
| --- | --- | --- |
| Morning | 08:30~09:30 | Hello! |
| Afternoon | 12:30~13:30 | Good~ |
| Evening | 17:30~18:30 | Bye~ |
| Night | 23:30~00:30 | See U~ |

When the greeting behavior starts, the mobile phone can generate an event. The event can occur based upon a probability set according to the times of the greeting behaviors. In an exemplary embodiment of the present invention, the probability is about 10%. If the event does not occur during the greeting time period (that is, the mobile phone is off during the greeting time period or the character house is not activated), the event becomes invalid.

FIG. 13 is a screen image illustrating a character animation with an event in a screen image presentation technique according to an exemplary embodiment of the present invention.

Referring to FIG. 13, if the character animation starts, text is presented in the form of a text balloon. The text expression for an event is presented in the text balloon. The text balloon can be displayed with, for example, a 30% transparency. The text balloon for expressing the event can be presented together with an image. In an exemplary embodiment of the present invention, a gift event text is presented with a gift image as shown in FIG. 13. The gift image is preferably presented at a bottom left or bottom right portion of the screen. In yet other embodiments of the present invention, the gift event can be replaced by money or some other item event.

The items and background are selected and arranged on the screen for decorating the character house.

Figure 14:
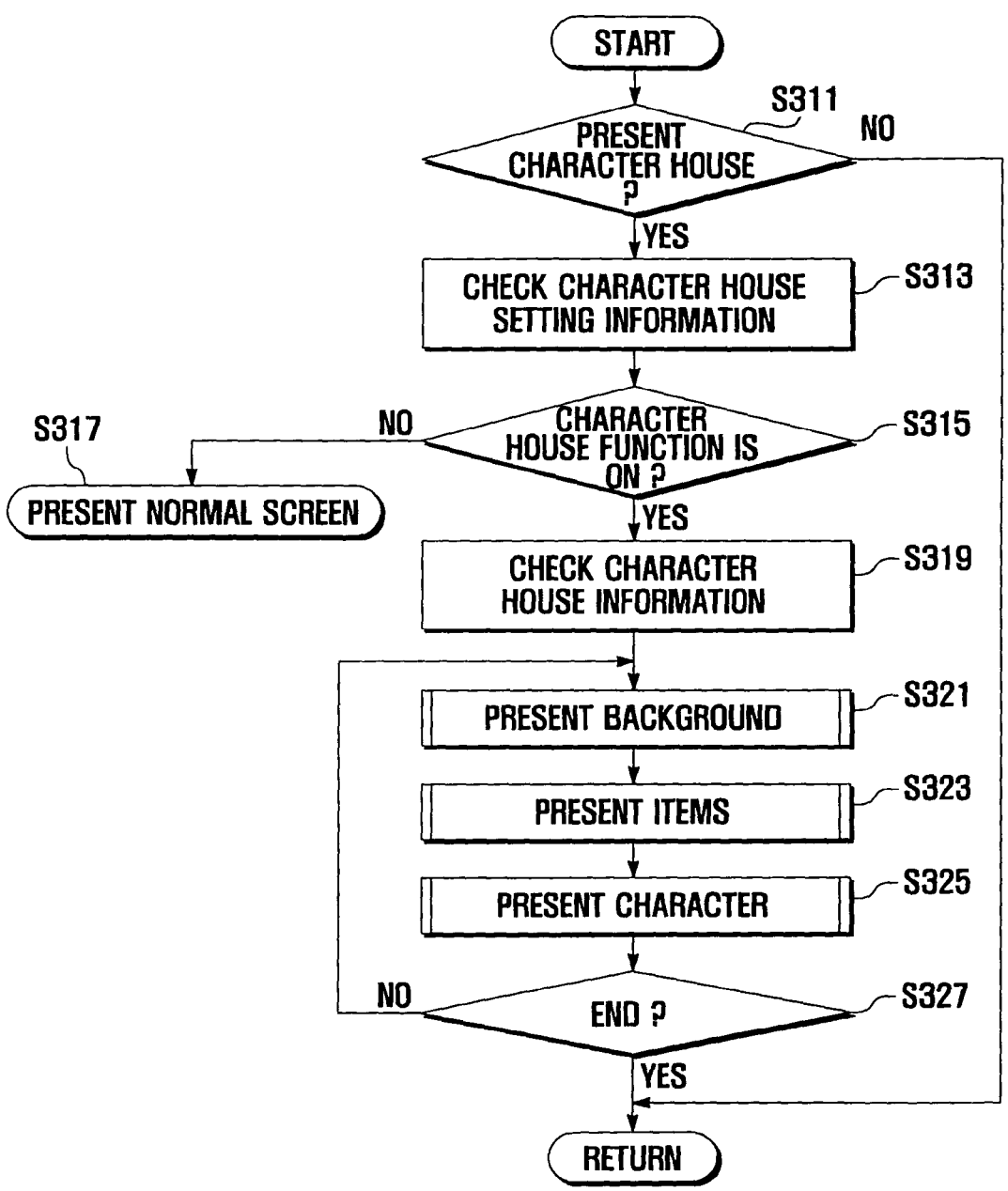
FIG. 14 is a flowchart illustrating a character house presentation procedure of a screen image presentation method according to an exemplary embodiment of the present invention.

FIG. 14 is a flowchart illustrating a character house presentation procedure of a screen image presentation method according to an exemplary embodiment of the present invention.

Referring to FIG. 14, the controller 110 controls the operations of the mobile phone and determines whether the mobile phone enters a character house presentation mode at step (S311). If the mobile phone enters the character house presentation mode, the controller checks the character house configuration information at step (S313). The character house presentation mode can be substantially identical with the idle mode of the mobile phone. In the idle mode, the controller 110 displays the character house on the screen of the display unit 143 during a predetermined display period. If the display period ends, the controller 110 turns off the display unit 143 to save power. If a clam shell or a slide of the mobile phone is open in the idle mode, the controller 110 turns on the display unit 143.

The character house configuration information includes parameters configured using a setting application. The parameters can include information for activating or deactivating the character house function. The character house configuration information can include character house on/off information, and character information display on/off information. If the character house configuration information includes the character house function related information, the controller 110 determines whether the character house function is turned on at step (S315). If it is determined that the character house function is turned off, the controller 110 displays a normal idle mode screen at step (S317).

If it is determined that the character house function is turned on, the controller 110 checks the character house information at step (S319). The character house information is on the currently set character house. The character house information includes the information on the background and items associated with the character house. The background information includes a background image ID, and the item information includes item IDs and positions of the items on the screen (for example, X and Y coordinates).

The character house can be displayed with one or more items, and the items are arranged in an order of presentation priorities such that if two items are overlapped, the item having a higher priority is displayed over the other item. By checking the character house information, the controller 110 recognizes the background and items with their positions on the screen of the display unit 143.

After checking the character house information 213, the controller 110 controls operations of the mobile phone to present the background, items and character at steps (S321), (S323) and (S325), respectively. In FIG. 14, the character house presentation is performed in the order of background, items and character. However, in yet other embodiments of the present invention, the presentation order of the elements can be varied. For example, the elements of the character house can be presented in an order of background, character and items, an order of character, background and items, and an order of character, items and background. That is, the character house presentation can be performed in various orders. Through the steps (S321) to (S325), the character house presentation is completed.

While presenting the character house, the mobile phone determines whether an event (for example, a function selected by a key input) occurs or a predetermined display time ends at step (S327). If an event occurs or the display time ends, the controller 110 ends the presentation of the character house and then performs the selected. function or turns off the display unit. Also, it is possible to perform the selected function while maintaining the character house screen. For example, if a message is received while the character house is displayed or a message transmission mode is activated, the controller 110 can maintain the presentation of the character while reading the received message and writing a message to transmit. That is, the controller 110 displays a message received or to be transmitted in a transparent message window on the character house screen. Also, the controller 110 can increase the transparency of the character house presentation and display the message on the character house presentation. Other events can also be processed while the character house is presented in a similar manner.

The character house element presentation procedure of steps (S321), (S323) and (S325) will now be described in greater detail.

First, the background of the character house can be presented by way of an exemplary method described in greater detail below.

Figure 15:
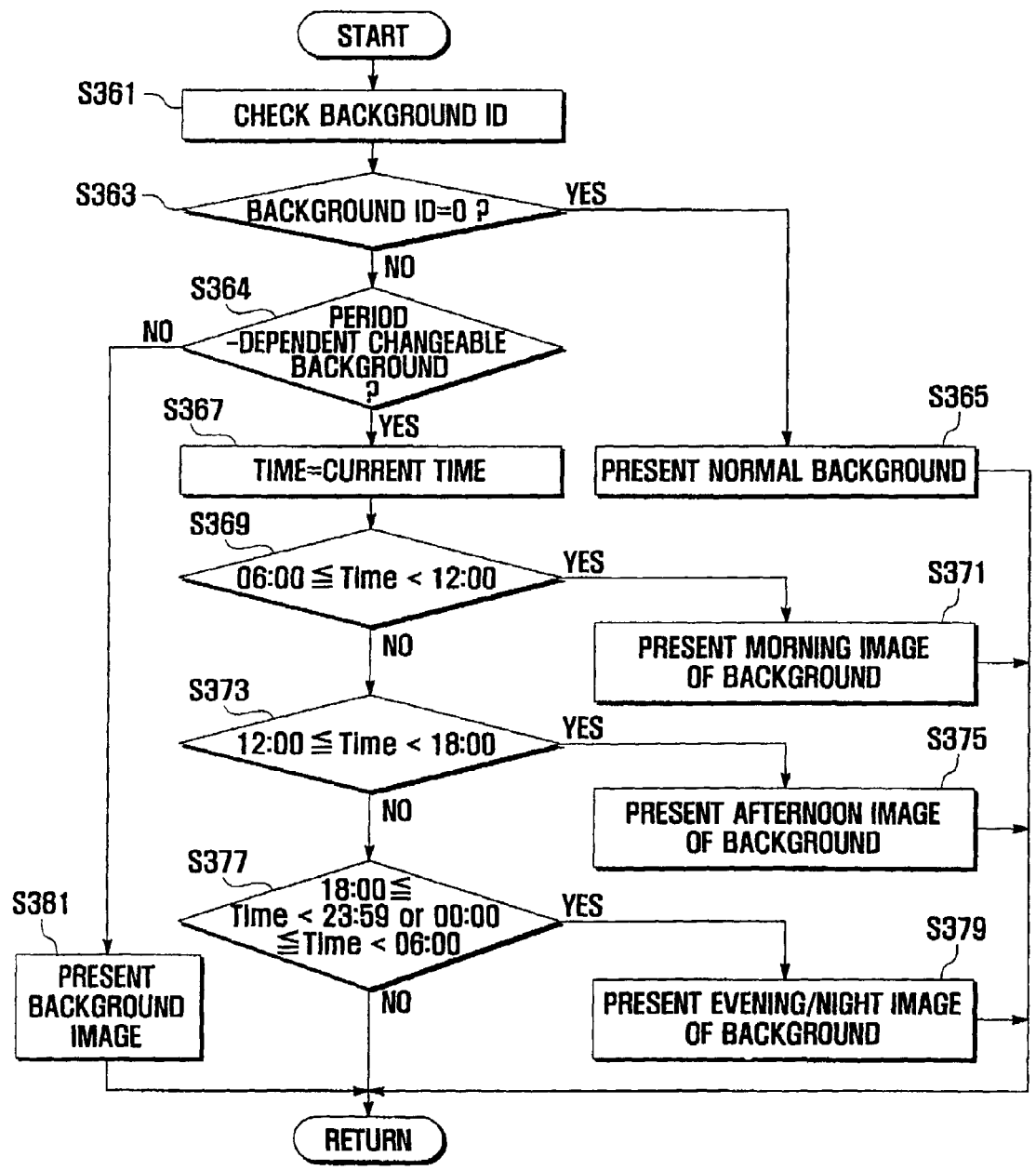
FIG. 15 is a flowchart illustrating the background presentation procedure of FIG. 14 according to an exemplary embodiment of the present invention.

FIG. 15 is a flowchart illustrating the background presentation procedure of FIG. 14. Referring to FIG. 15, the controller 110 checks a background ID of the character house at step (S361), and determines whether the background ID is 0 at step (S363). The background ID "0" denotes that the character house does not use any background image. If the background ID is 0, the controller 110 loads a normal background image set as a default image at step (S365). If the default background image is not set, no background image is presented.

If the background ID is not 0, the controller 110 retrieves a background corresponding to the background ID and presents the retrieved background on the screen. In this case, the controller 110 selects one of the backgrounds as shown by way of example in FIG. 6 on the basis of the background ID.

The background of the character house can be represented by multiple images that are presented at different time periods. The background of the character house can also be represented by a fixed single image.

Accordingly, after retrieving the background, the controller 110 determines whether the retrieved background is a multiple image background at step (S364). If the retrieved background is a multiple image background, the controller checks the current time at step (S367) and determines if the current time is greater than or equal to 06:00 and less that 12:00 at step (S369).

If the current time is greater than or equal to 06:00 and less than 12:00, the controller 110 selects a morning image assigned for the morning or forenoon from the multiple image background and then displays the morning image on the screen at step (S371). If the current time is not greater than or equal to 06:00 or not less than 12:00, the controller 110 determines whether the current time is greater than or equal to 12:00 and less than 18:00 at step (S373).

If the current time is greater than or equal to 12:00 and less than 18:00, the controller 110 selects an afternoon image assigned for the afternoon from the multiple image background and then displays the afternoon image on the screen at step (S375). If the current time is not greater than or equal to 12:00 or not less than 18:00, the controller 110 determines whether the current time is greater than or equal to 18:00 and less than 23:59, or greater than or equal to 00:00 or less than 06:00 at step (S377).

If the current time is greater than or equal to 18:00 and less than 23:59, or greater than or equal to 00:00 or less than 06:00, the controller 110 selects an evening or night image assigned for the evening or night from the multiple image background and displays the evening or night image on the screen at step (S379). At step (S364), if the retrieved background is not a multiple image background, the controller regards the retrieved image as a fixed single image background and displays the fixed signal image as the background at step (S381).

In the case of using the multiple image background, a single fixed image can be used by changing the brightness of the image for the respective time periods of a day.

Second, the items of the character house can be presented by way of an exemplary method described in greater detail below.

Figure 16:
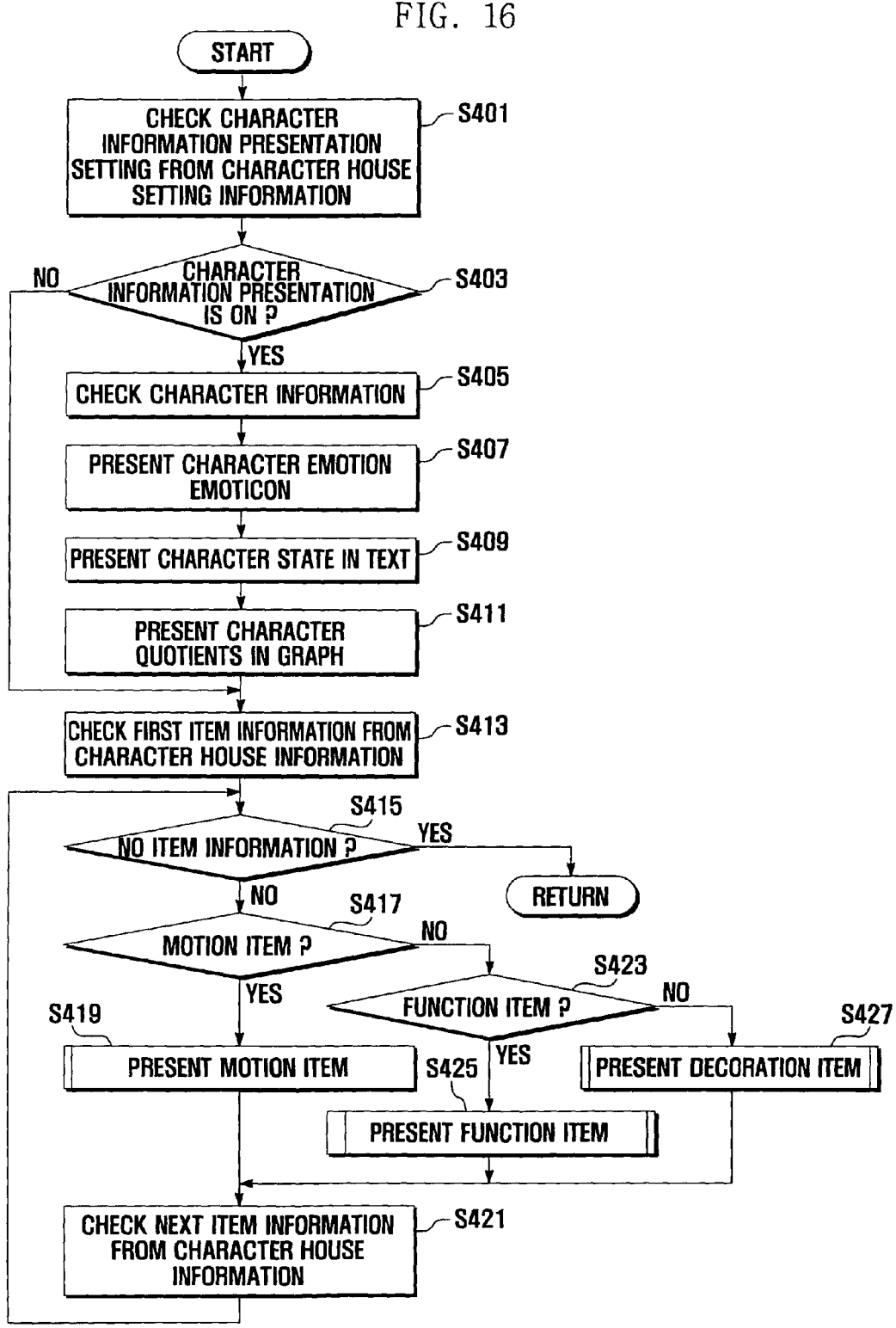
FIG. 16 is a flowchart illustrating the item presentation procedure of FIG. 14 according to an exemplary embodiment of the present invention.

FIG. 16 is a flowchart illustrating the item presentation procedure of FIG. 14. The item presentation procedure of FIG. 16 is described with the character information presentation of FIG. 7B. However, the character information presentation can be preformed with the background presentation procedure, or the character presentation procedure of FIG. 19.

In an exemplary embodiment of the present invention, it can be assumed for example that the character information presentation is included in the item presentation procedure as shown in FIG. 16. The emotions for expressing the emotion of the character, texts for expressing the state of the character, and the character quotients, shown in FIG. 7B, included in the character information, have been described.

Referring to FIG. 16, the controller 110 checks to determine if the character house configuration information 213 includes information on a character quotient presentation function at step (S401), and determines whether the character information presentation function is on at step (S403). If the character information presentation function is on, the controller 110 checks the character quotient information at step (S405) and presents a character emotion on the basis of the character quotient information in the emotion icon display region 263 of FIG. 7B at step (S407). The emotion of the character can be represented by a plurality of emotion modes including, for example, happy, normal, angry, sad and tired. The emotion to be displayed in the emotion icon display region 263 can be one of the emotions corresponding to the emotion modes, as shown in FIG. 8.

After presenting the emotion, the controller 110 presents text corresponding to the current state of the character in the status display region 265 of FIG. 7B at step (S409) and then presents the character quotients (SQ, HQ, IQ, and EQ) in the quotient information display region 267 of FIG. 7B in the form of bar graphs at step (S411). The values of the character quotients can be presented as different colored bars.

As described above, if the character information presentation function is enabled, the controller 110 checks the character quotients and determines the emotion mode on the basis of the character quotients. If the emotion mode is determined, the controller 110 presents an emotion corresponding to the emotion mode, text appropriate for the state of the character, and the quotients in the form of the bar graphs.

The character information based on the character quotients can be presented at a fixed position in the character house (for example, a top left portion) as shown in FIG. 7A in the form as shown in FIG. 7B. The character quotient information cannot be presented according to the user's configuration. That is, whether to present the character information is decided by the user. If the user does not activate the character information presentation function, the controller recognizes the configuration at step (S403), such that the steps (S405) to (S411) are skipped. In this case, the character information based on the character quotients information shown in FIG. 7B is not presented.

After presenting the character quotients, the controller checks the information on an item having a lowest priority (depth) at step (S413). The item information includes an item ID and display position. The item can be one of the motion items, function items and decoration items. In some cases, two or more. items can be overlapped. The items are presented in an order of the presentation priorities assigned to the items such that the item having a lowest priority is presented first. That is, when two or more items are overlapped, only the item having the highest priority is completely presented. If the item on top is disabled, the item having the second highest priority is presented.

Accordingly, after checking the item information, the controller 110 determines whether the item information exists at step (S415). If the item information exists, the controller 110 determines whether the item is a motion item on the basis of the item information at step (S417). If the item is a motion item, the controller 110 presents the motion item at step (S419) and checks another item having the next lowest priority at step (S421). If it is determined that the item is not a motion item at step (S417), the controller 110 determines whether the item is a function item at step (S423). If it is determined that the item is a function item, the controller 110 presents the function item at step (S425). If the item is not a function item, the controller 110 presents the item as a decoration item at step (S427).

The item presentation is performed in a different manner according to the type of the item. That is, the motion item, function item and decoration item, are presented in different procedures.

Figure 17:
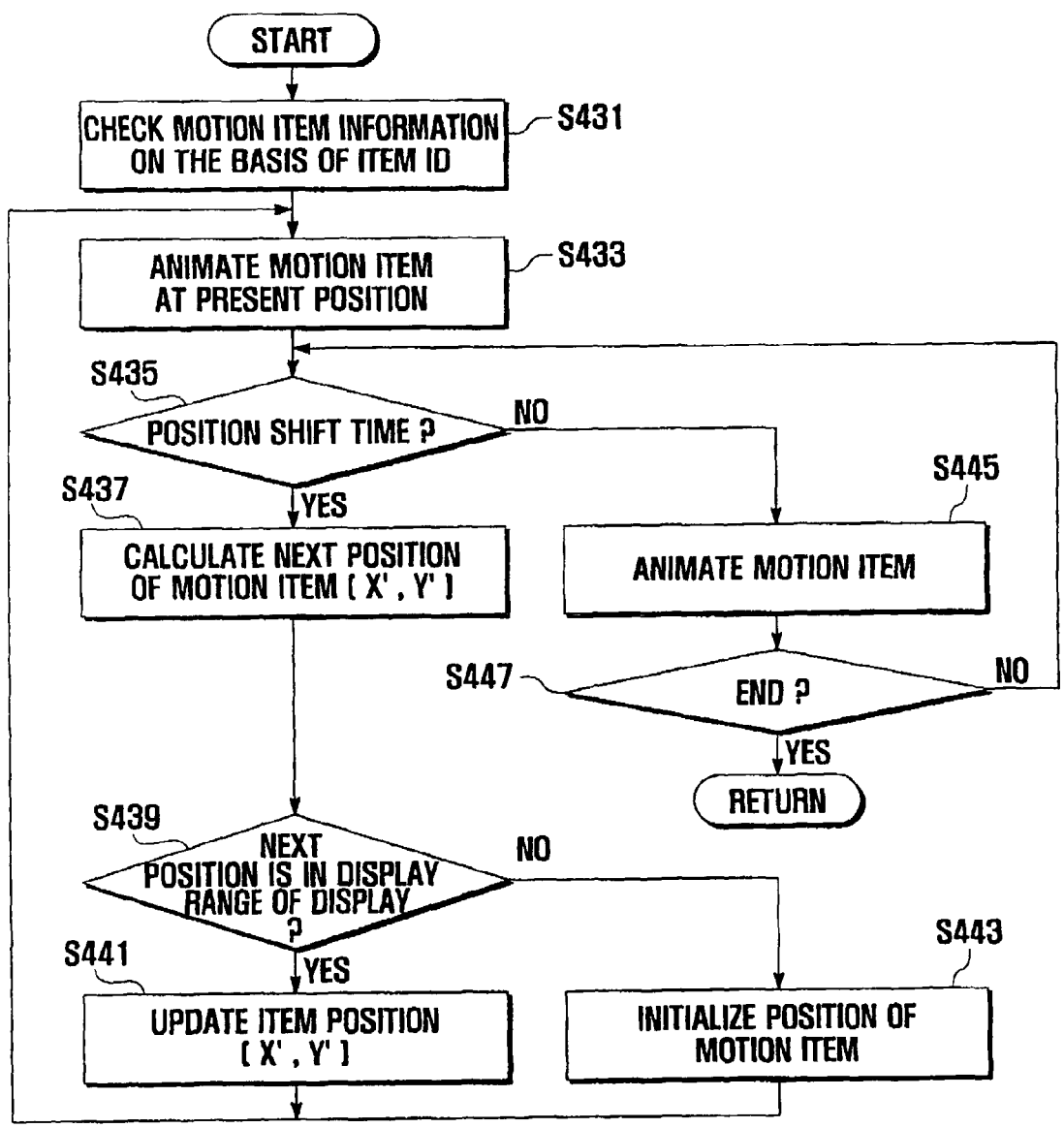
FIG. 17 is a flowchart illustrating a procedure for presenting a motion item in a screen image presentation technique according to an exemplary embodiment of the present invention.

FIG. 17 is a flowchart illustrating a procedure for presenting a motion item in a screen image presentation technique according to an exemplary embodiment of the present invention.

Referring to FIG. 17, the controller 110 checks the motion item information on the basis of the item ID at step (S431). The motion item information includes an item ID, a sojourn time for keeping the item at the initial position, a coordinate represented by a horizontal distance (X axis distance) for moving the item to the next position and a vertical distance (Y axis distance) for moving the item to the next position, and initial position information. The initial position information can contain one of the plurality of coordinates listed by way of example in Table 3 below. It can be assumed for example, that the motion item starts moving from an edge of the screen as the initial position (i.e., 4 sides and 4 corners of the screen of the display unit 143) in Table 3. The motion item also can be configured to start moving at a random position in the screen of the display unit 143.

TABLE 3

1. (X = 0)
2. (X = LCD_X_MAX)
3. (Y = 0)
4. (Y = LCD_Y_MAX)
5. (X = 0, Y = 0)
6. (X = 0, Y = LCD_Y_MAX)
7. (X = LCD_X_MAX, Y = 0)
8. (X = LCD_X_MAX, Y = LCD_Y_MAX)

After checking the motion item information, the controller 110 obtains the initial position of the motion item so as to animate the motion item at the initial position at step (S433). The animation is maintained until the ending of the sojourn time, and then the motion item is positioned at the next position through the steps (S435) to (S445). After animating the motion item, the controller 110 determines whether the sojourn time expires at step (S435). If the sojourn time has expired, the controller 110 calculates a coordinate of the next position to which the motion item moves at step (S437). After calculating the next position coordinate, the controller 110 determines whether the calculated next position is in an available display range on the screen of the display unit 143 at step (S439). If the calculated next position is in the available display range, the controller 110 moves the motion item to the next position at step (S441), and then returns to step (S433) to animate the motion item at the next position. At step (S439), if the calculated next position is not in the available display range, the controller 110 determines that the movement of the motion item is completed and makes positions of the motion item the initial position at step (S443) and repeats the step (S433).

As described above, the motion item is configured with one of the initial positions as shown by way of example in Table 3, and moves to a predetermined coordinate on the screen after a predetermined time. The motion item is animated at the initial position, moved to the next position after the sojourn time, and is then animated again, under the control of the controller 10. The movement time is determined on the basis of the sojourn time and a distance between the two positions. If the sojourn time is short and the distance between the two positions is close, the motion item moves fast. However, if the sojourn time is long and the distance between the two positions is far from each other, the motion item moves slowly.

The movement direction of the motion item depends on the relationship of the two positions (coordinates on the screen). The motion item can move in horizontal, vertical and diagonal directions, and can be determined in consideration of the distance between the two positions. The motion item can be one of the items depicted in FIG. 10 and move in the manner shown in FIG. 10B. The motion items move on the screen as shown in FIG. 10B in accordance with the procedure of FIG. 17.

The movement of the motion item stops at the time when the character house presentation ends, but can be set to stop at a time different from the character house presentation end time. That is, the motion item presentation time can be shorter than the character house presentation time. In this case, the motion item disappears before the character house presentation stops.

Accordingly, if the sojourn time has not expired at step (S435), the controller 110 maintains the animation of the motion item at step (S445) and determines whether the motion item presentation time has ended at step (S447). If the motion presentation time has ended, the controller stops presentation of the motion and if not, repeats the step (S435).

FIGS.; 18A to 18D are flowcharts illustrating a procedure for presenting function items in a screen image presentation technique according to an exemplary embodiment of the present invention.

Figure 18A:
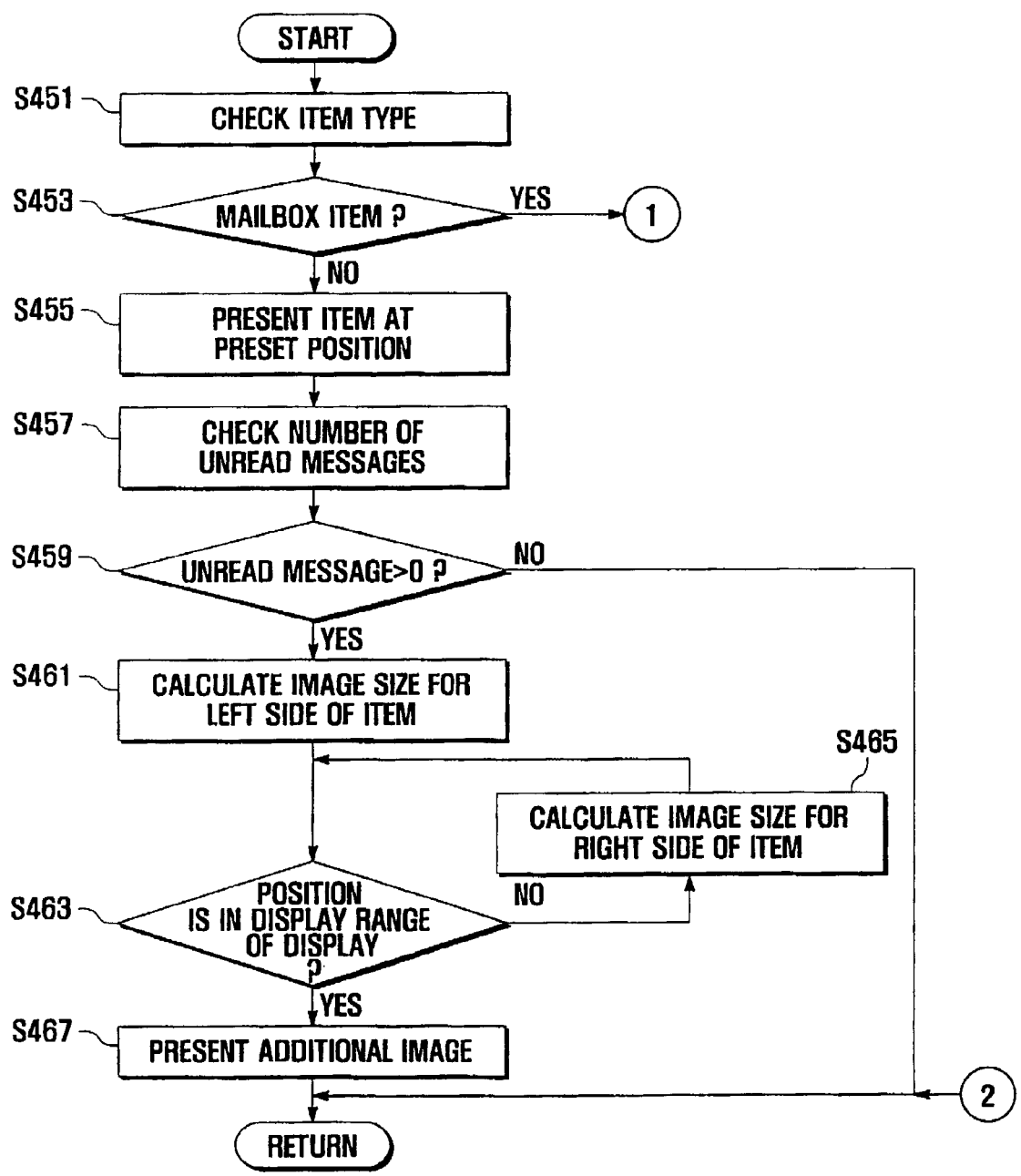
FIGS. 18A to 18D are flowcharts illustrating a procedure for presenting function items in a screen image presentation technique according to an exemplary embodiment of the present invention.
Figure 18B:
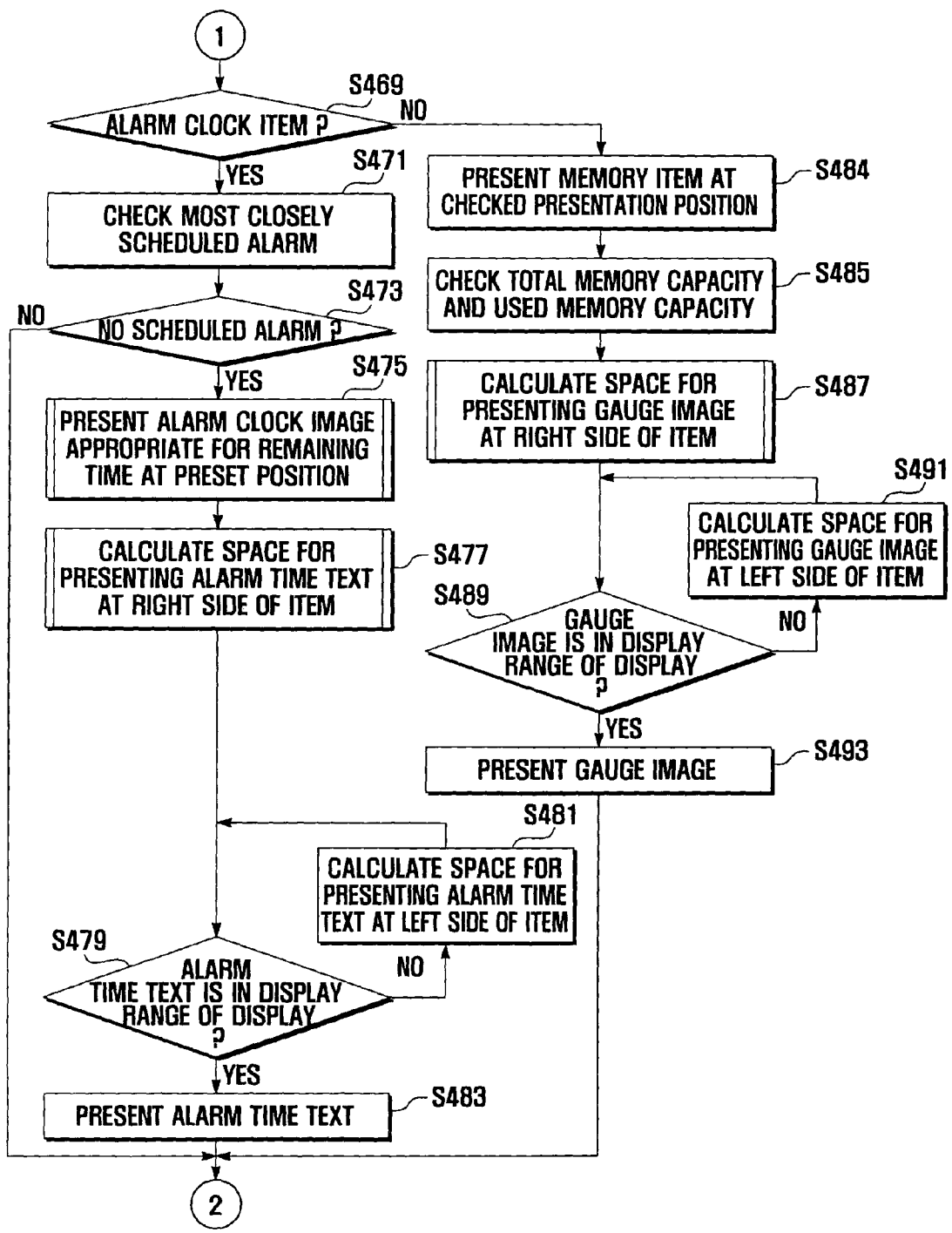

Referring to FIGS. 18A and 18B, the controller 110 checks a function item type at step (S452). In an exemplary embodiment of the present invention, it can be assumed for example, that there are a plurality of function items including a mailbox item, an alarm clock item, and a memory monitor item. In yet other embodiments of the present invention, the number and type of functions items can be varied.

After the function item is checked, the controller 110 determines whether the function item is a mailbox item at step (S453). If the function item is the mailbox item, the controller checks a presentation position of the mailbox item and presents the mailbox item at the presentation position on the screen at step (S455). Next, the controller 110 checks a number of received but unread messages at step (S457), and determines whether the number of unread messages is greater than 0 at step (S459). If the number of the unread messages is not greater than 0, the controller presents an empty mailbox image.

If the number of the unread messages is greater than 0, the controller 110 displays the number of the unread messages with the mailbox image at steps (S461) to (S467). The number of the unread messages can be presented in various manners. For example, the number of unread messages can be displayed on the mailbox image. Also, the number of unread messages can be displayed by means of a text balloon. In this case, the. text balloon has a shape of a postcard with the number of the unread messages. In an exemplary embodiment of the present invention, the mailbox item presentation is explained with the text balloon image for displaying the number of the unread messages.

According to the position of the mailbox item, the controller 110 determines an unread message number presentation position. The controller 110 checks the left and right side spaces of the mailbox items at steps (S461) and (S465), and arranges the text balloon at the left or right side. If it is determined that the text balloon is arranged at the left side, the controller 110 determines whether the text balloon presentation position is in the available display range of the screen at step (S463). If the text balloon presentation position is in the available display range, the controller 110 presents the text balloon at the left side of the mail box at step (S467). If the text balloon presentation position is not in the available display range, the controller 110 determines to position the text balloon at the right side of the mailbox item at step (S465) and repeats the step (S463).

At step (S453), if it is determined that the function item is not the mail box item, the controller determines whether the function item is an alarm clock item at step (S469) in FIG. 18B. If the function item is the alarm clock item, the controller 110 checks scheduled alarms on the basis of alarm information at step (S471). The alarm information includes the presentation position of the alarm clock item on the screen of the display unit 143. After checking the scheduled alarms, the controller determines whether the there are scheduled alarms at step (S473). If no alarm is scheduled, the controller 110 presents an empty alarm image. If there is at least one scheduled alarm, the controller 110 retrieves a next scheduled alarm and displays an alarm clock image with the next scheduled alarm at step (S475). The alarm clock item can be implemented with a clock image. In this case, the alarm clock image can have the hands arranged for showing the scheduled alarm time.

Next, the controller 110 checks an alarm time presentation position and determines whether there is enough space to present the alarm time at the right side of the alarm clock item in the screen. If there is enough space to present the alarm time, the controller 110 presents the next scheduled alarm time at the right side of the alarm clock item at step (S477).

If it is determined that there is not enough space to present the alarm time at the right side of the alarm clock item at step (S479), the controller 110 presents the alarm time at the left side of the alarm clock item at step (481). The alarm can be represented by a morning call, a meeting schedule, a reservation, and so forth. The scheduled alarms are activated at the scheduled times with the specific events. The alarm time can be shown in the form of YYYY/MM and HH/MM, as text at step (S483). The alarm time text can be placed at the left or right side of the alarm clock item according to the position of the alarm clock item.

If two or more alarms are scheduled, the alarm time of the closest next alarm is presented. The alarm time can be presented by means of the alarm clock image. When the alarm time is presented by means of the alarm clock image. The alarm time text may not be presented.

If it is determined that the function item is not the alarm clock item at step (S469), the controller 110 determines that the function is a memory item. Next, the controller 110 checks a presentation position of the memory item from the character house information 213 and presents the memory item at a checked presentation position at step (S484). After presenting the memory item on the screen, the controller 110 checks a total memory capacity and used memory capacity at step (S485), and then displays the information on the total memory capacity and the user memory capacity at steps (S487) to (S493).

That is, after checking the memory information, the controller 110 checks which side of the memory item has enough space for presenting the memory information. If it is determined that the right side of the memory item has enough space for presenting the memory information, the controller 110 presents the memory information at the right side of the memory item. If it is determined that the right side of the memory item does not have enough space for presenting the memory information, the controller 110 presents the memory information at the left side of the memory item. The memory item can inform the user of the memory information of the memory unit 130 of FIG. 1, and the memory information can be shown in the form of a gauge bar. The gauge bar can be located at the left or right side according to the position of the memory item on the screen. The gauge bar shows the memory utilization, and changes color, for example, from green to red, if the memory utilization exceeds a value, such as 90%.

As describe above, a function item is presented in such a manner that the controller checks the presentation position of the function -and presents the function item at the presentation position on the screen of the display unit 143 together with the function information obtained by the function item. The function information is presented in such a manner that the controller checks which side of the function item has a enough space for presenting the function information, and then presents the function information at a left or right side of the function item, where space is provided. The function information can be shown as text or a graphical gauge. When the function information is provided in the text, the graphical gauge can be omitted.

Figure 18C:
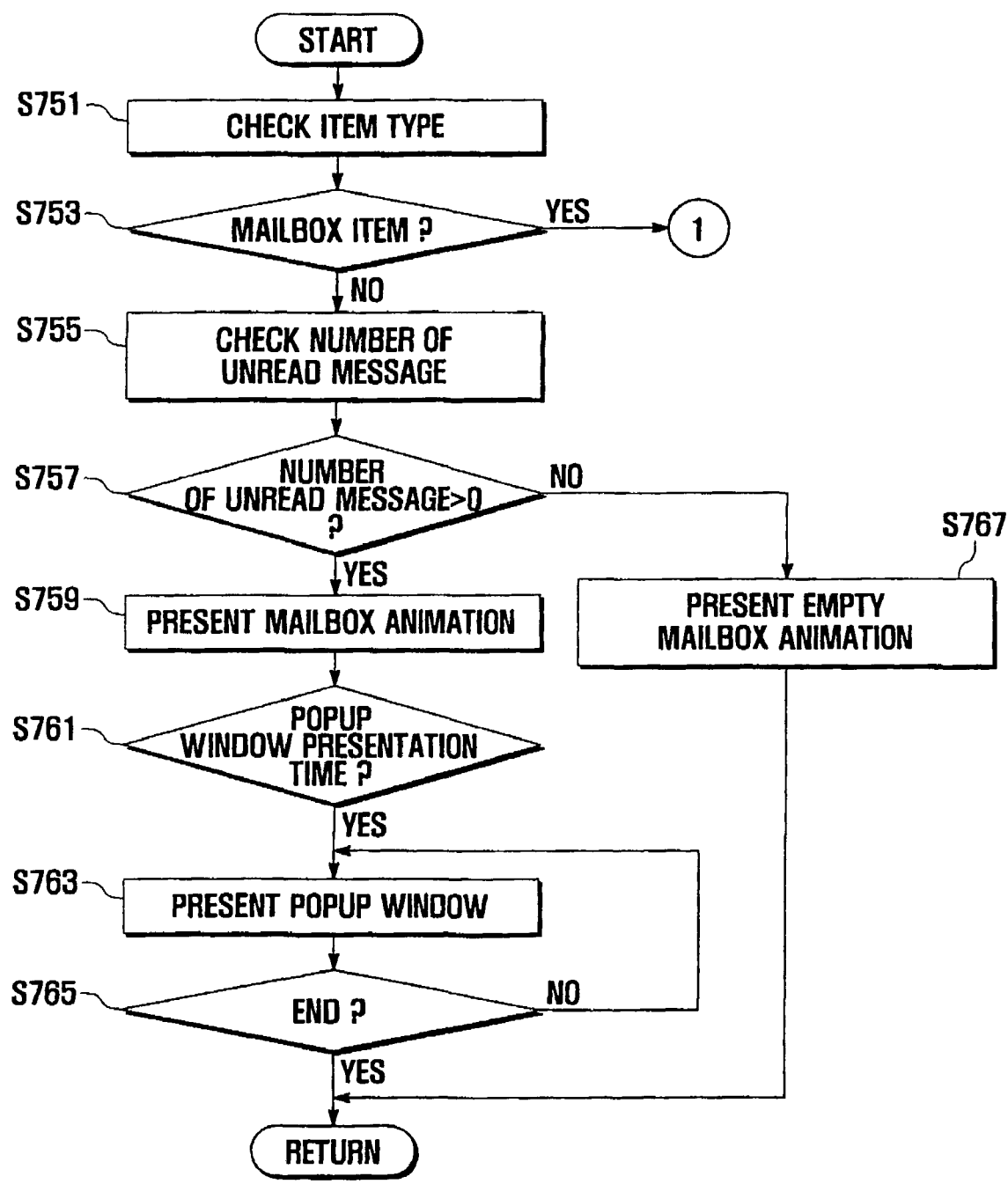
Figure 18D:
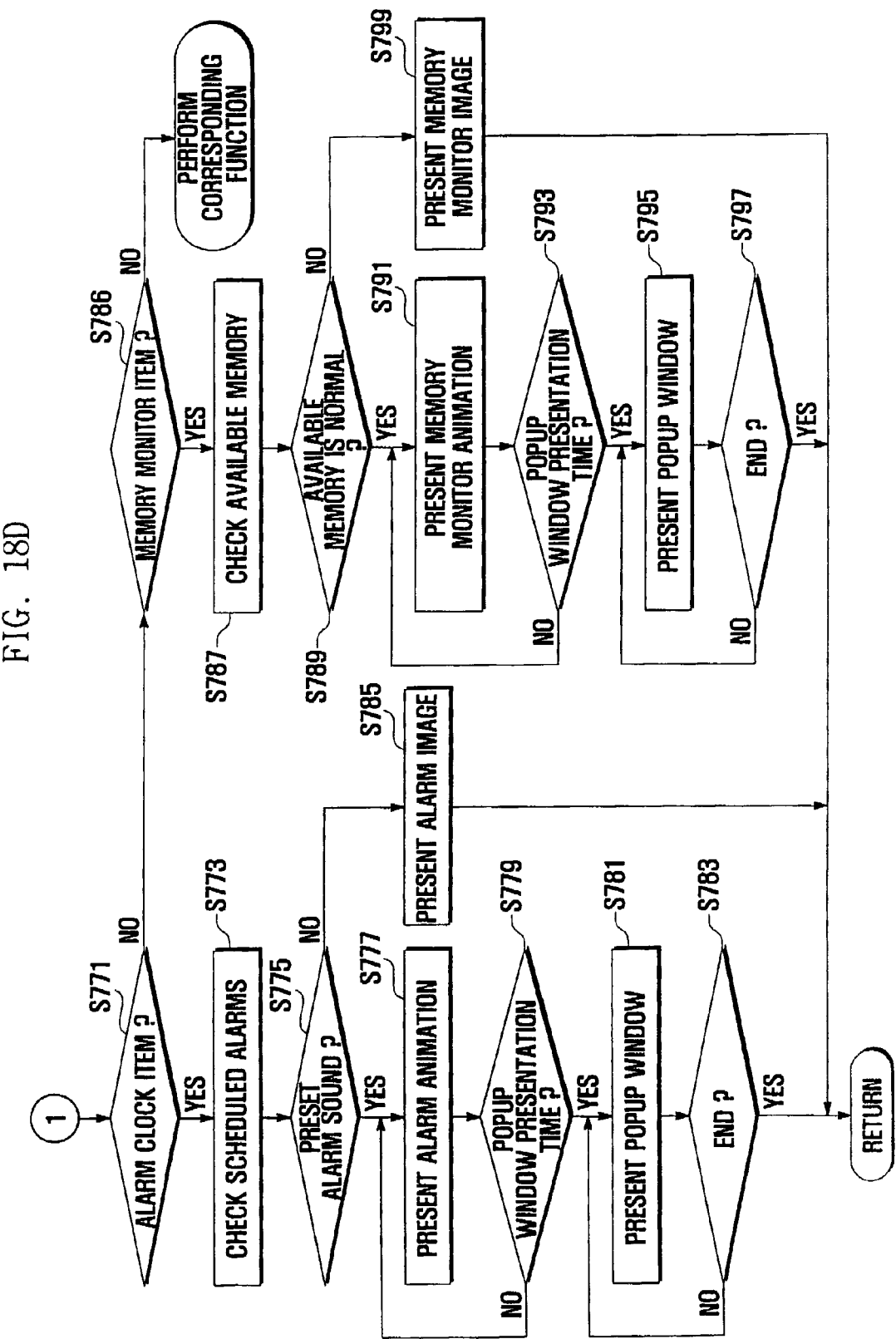

FIGS. 18C and 18D are flowcharts illustrating a procedure for presenting function items in a screen image presentation technique according to another exemplary embodiment of the present invention.

Referring to FIGS. 18C and 18D, the controller 110 checks a function item type at step (S751). In an exemplary embodiment of the present invention, it can be assumed for example, that there are a plurality of function items including a mailbox item, alarm clock item, and memory monitor item. In yet other embodiments of the present invention, the number and types of function items can be varied. If there is function information associated with a function item, the controller presents the function item in the form of an animated function item for attracting the user's attention, and presents the function information in a popup window during a popup display time. In an exemplary embodiment of the present invention, the function items are presented in an order of mailbox item, alarm clock item, and memory item. However, the order of function items can be varies.

After the function item is checked, the controller 110 determines whether the function item is the mailbox item at step (S753). If the function item is the mailbox item, the controller 110 checks a number of unread mail items at step (S755), and then determines whether the number of the unread mail items is greater than 0 at step (S757). If the number of the unread mail items is 0, the controller 110 presents an empty mailbox image on the screen of the display unit 143 as shown in FIG. 9J at step (S767) for notifying the user that there are no unread messages.

Figure 9K:
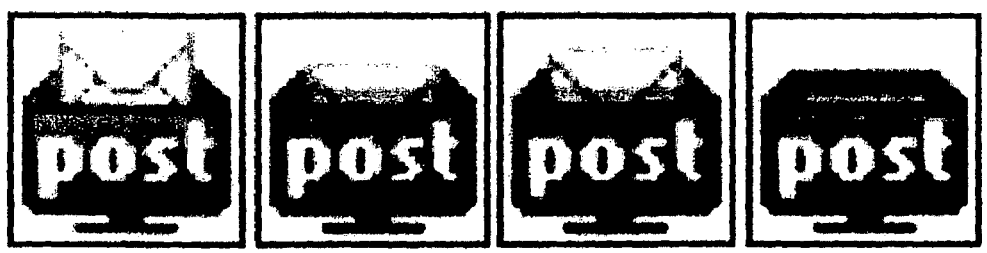
Figure 9L:

If the number of the unread mail items is greater than 0, the controller 110 presents an animated mailbox image as shown in FIG. 9K at step (S759). After presenting the animated mailbox image, the controller determines whether a popup time has arrived at step (S761). If the popup time has arrived, the controller 110 presents a popup window as shown in FIG. 9L at step (S763). The popup window is displayed during a predetermined popup time and then disappears. At substantially the same time as the presentation of the popup window, the controller 110 starts a popup counter. After the popup window is presented, the controller determines whether the popup counter has expired at step (S765). If the popup counter has expired, the popup window disappears.

If the function item is not the mailbox item at step (S753), the controller 110 determines whether the function item is an alarm clock item at step (S771) in FIG. 18D. If the function item is the alarm clock item, the controller 110 checks scheduled alarms at step (S773), and determines whether there are scheduled alarms at step (S775). If there is no scheduled alarm, the controller 110 presents an empty alarm image on the screen of the display unit 143 for notifying the user that there are no scheduled alarm as shown in FIG. 9G at step (S785). If there is at least one scheduled alarm, the controller 110 presents an animated alarm clock image as shown in FIG. 9H at step (S777), and determines whether a popup time has arrived at step (S779).

If the popup time has arrived, the controller 110 presents a popup window as shown in FIG. 9I at step (S781). The popup window is displayed during a predetermined popup time and then disappears. At substantially the same time of the presentation of the popup window, the controller 110 starts a popup counter. After the popup window is presented, the controller 110 determines whether the popup counter has expired at step (S783). If the popup counter is expired, the popup window disappears. The popup window presentation time can be configured in consideration of the alarm time. In an exemplary embodiment of the present invention, it can be assumed for example, that the scheduled alarm is an alarm set with a specific date and time for "meeting" and "to do", rather than for providing an everyday occurrence alarm (for example, a morning call), and displays alarms within, for example, 6 hours.

If the function item is not the alarm clock item, the controller 110 determines whether the function item is a memory monitor item at step (S786). If the function item is the memory monitor item, the controller 110 checks memory utilization at step (S787), and determines whether the memory utilization is within a predetermined normal range at step (S789).

If the memory utilization is within the normal range, the controller 110 presents only the memory monitor item image on the screen of the display unit 143 for notifying the user that the that the memory utilization is normal, as shown in FIG. 9D at step (S799). If the memory utilization exceeds the normal range, the controller 110 presents an animated memory monitor as shown in FIG. 9E at step (S79 1), and determines whether a popup time has arrived at step (S793).

If the popup time has arrived, the controller 110 presents a popup window as shown in FIG. 9F at step (S795). The popup window is displayed during a predetermined popup time and then disappears. At substantially the same time of the presentation of the popup window, the controller 110 starts a popup counter. After the popup window is presented, the controller 110 determines whether the popup counter has expired at step (S797). If the popup counter has expired, the popup window disappears. The memory monitor item can be displayed regardless of the memory utilization. In this case, the controller 110 checks the memory utilization and then presents the memory utilization in the form of a popup window.

As described above, the function items can be presented together with the character house. In this case, the function items are displayed in a preset order. While presenting the function items in the preset order, the controller checks whether to present the function items in an active state. If it is determined that a function item is to be presented in the active state, the controller 110 presents the function item as an activated function item image, and then provides the information related to the function in the form of a popup window after a while.

The popup window is presented during a predetermined popup time. For example, when all of the function items are presented in the active state, the controller 110 presents, in the following order, the mailbox item as an animated mailbox image followed by the mailbox popup window, the alarm clock item as an animated alarm clock image followed by the alarm popup window, and the memory monitor item as an animated memory monitor image followed by the memory utilization popup window. The function items are presented in the character house as shown in FIGS. 9J, 9G, and 9D after the popup windows disappear.

The decoration items are presented on the basis of the decoration item information contained in the character house information. The item information includes an item ID informing a user of the kind of decoration item and a presentation position on the screen. The controller 110 retrieves a decoration item image corresponding to the item ID and presents the retrieved decoration item image at the presentation position on the screen as shown in FIG. 11A. The decoration item is used for improving an aesthetic factor of the character house, regardless of any function. The decoration item can be added or removed according to the user's configuration.

A exemplary procedure for presenting the character of the character house will now be described in greater detail.

In the character house, the character is implemented with a plurality of behavior properties.

First, according to an exemplary embodiment of the present invention, the character is configured to greet the user of the mobile phone at preset times. Second, according to an exemplary embodiment of the present invention, the character is configured to irregularly give the user a gift while greeting the user. Third, according to an exemplary embodiment of the present invention, the character is configured to express a state of the mobile phone or an emotion reflecting the state of the mobile phone in an animation or a motion. In an exemplary embodiment of the present invention, it can be assumed for example, that the mobile phone has various emotions that represent a user's contribution to the mobile phone. The character house can be presented with only the third behavior property. That is, the greeting and gift-giving behavior properties can be disabled when the character house is presented. In an exemplary embodiment of the present invention, it can be assumed for example, that the greeting, gift-giving and animation behavior properties are enabled.

The character house can consist of the items and background as well as the character, and the character house can be presented in a specific operation mode (such as the idle mode) of the mobile phone. In the case wherein the character house is presented in the idle mode, the character house can be shown as an idle mode screen (for example, when a clam shell of the mobile terminal is unfolded or a slide mobile phone is slid open). If an event occurs while the character house is presented, the character house disappears, i.e., the idle screen is replaced by an other function screen. Also, the character house can be maintained when a specific event occurs (for example, a message processing event).

Figure 19:
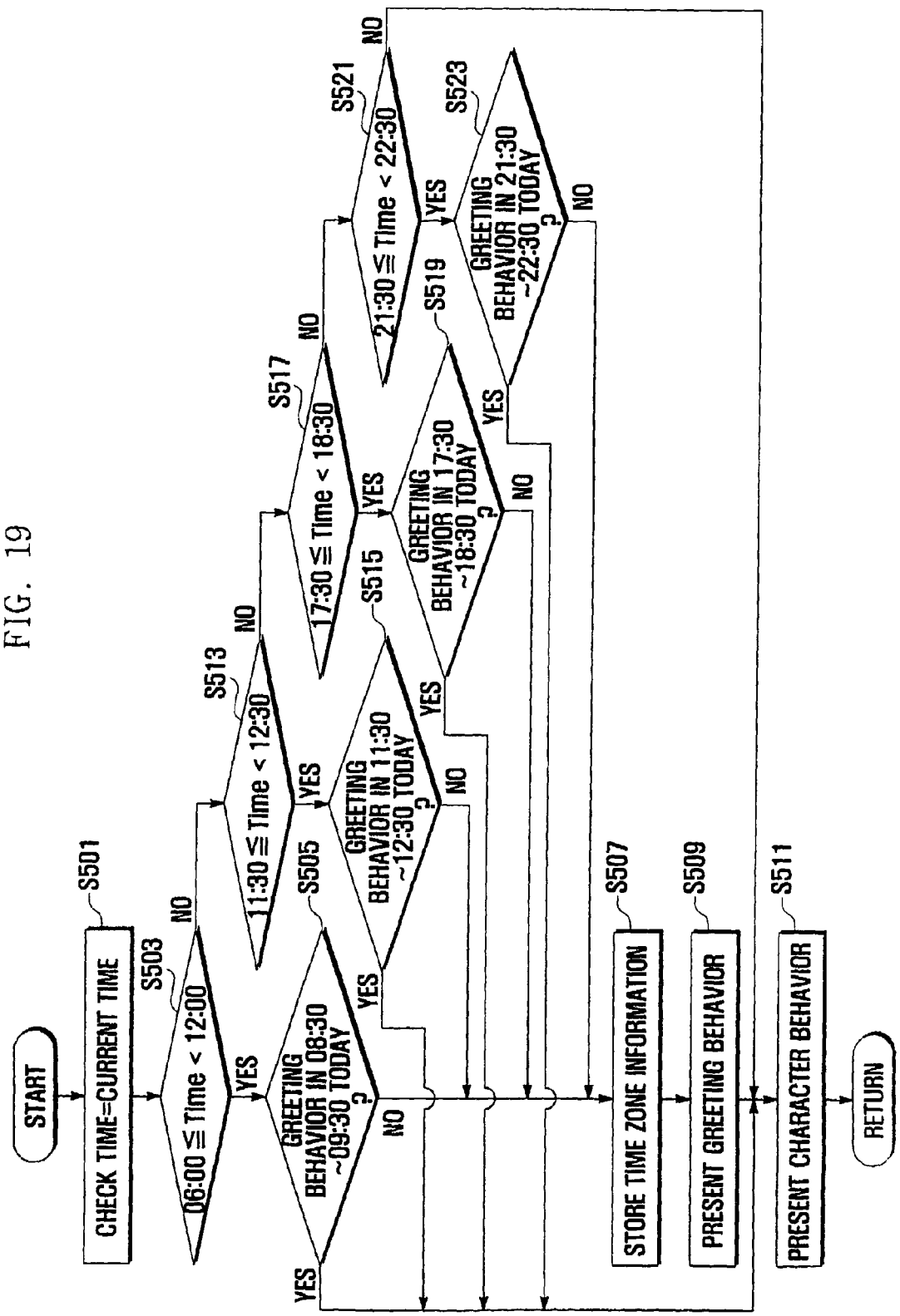
FIG. 19 is a flowchart illustrating a character presentation procedure of a screen image presentation method according to an exemplary embodiment of the present invention.

FIG. 19 is a flowchart illustrating a character presentation procedure of a screen image presentation method according to an exemplary embodiment of the present invention.

Referring to FIG. 19, the controller 110 checks a current time at step (S501), and then determines whether the current time is within any of the preset greeting behavior time periods at steps (S503), (S513), (S517) and (S521). In an exemplary embodiment of the present invention, the greeting behavior time periods are set to four times as in Table 2. The greeting behavior is provided once in a greeting behavior time period.

Accordingly, the controller 110 determines whether the current time is within the greeting behavior time periods at steps (S503), (S513), (S517) and (S521). If the current time is within the greeting behavior time periods, the controller 110 determines that the greeting behavior is to be shown at steps (S505), (S515), (S519) and (S523).

If it is determined that the current time is not within the greeting behavior time periods at the steps of (S503), (S513), (S517) and (S521), or greeting behavior has been performed already in the greeting behavior time zone at the steps (S505), (S515), (S519) and (S523), the controller 110 skips the greeting behavior and controls the character to be in a normal behavior at step (S511).

If it is determined that the current time is within the greeting behavior time periods at the steps of (S503), (S513), (S517) and (S521), and the greeting behavior has not yet been performed in the greeting behavior time periods at the steps (S505), (S515), (S519) and (S523), the controller 110 records the current time at step (S507), and controls the character to show the greeting behavior at step (S509). The current time is recorded to avoid performing the greeting behavior in the same greeting behavior time period again. After the greeting behavior is performed, the controller 110 controls the character to be in the normal behavior at step (S511).

Figure 20:
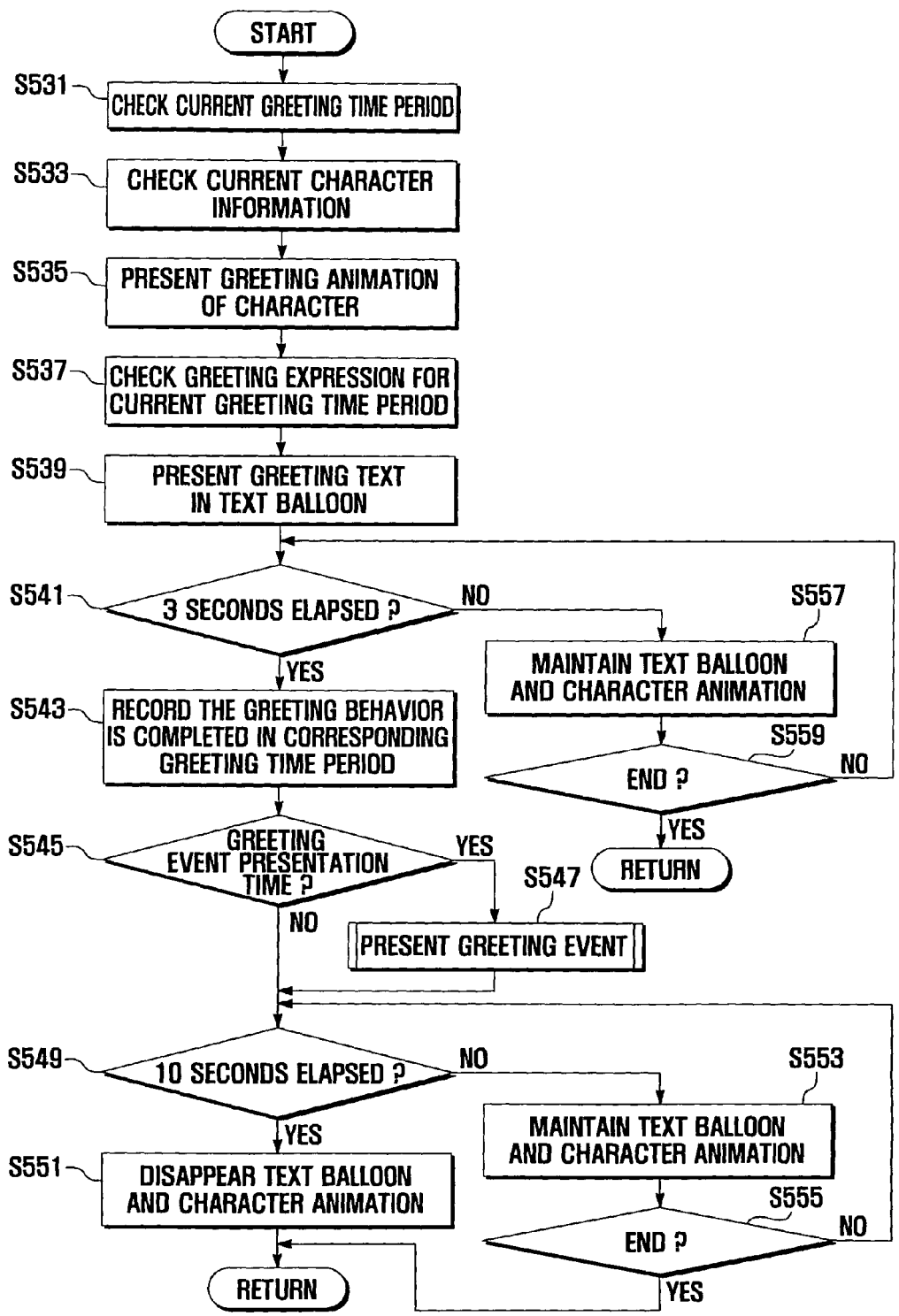
FIG. 20 is a flowchart illustrating the greeting behavior presentation procedure of FIG. 19 according to an exemplary embodiment of the present invention.

The exemplary greeting behavior presentation procedure is performed as shown in FIG. 20. The greeting behavior is presented as the character greets the user, and can be performed with a salutation and an addition event for giving an item or character money based upon a probability value.

FIG. 20 is a flowchart illustrating the greeting behavior presentation procedure of FIG. 19.

Referring to FIG. 20, the controller 110 checks a current greeting time zone at step (S531), and checks current character information at step (S533). Next, the controller 110 controls the character to show the greeting behavior in the form of an animation at step (S535), and retrieves a greeting text corresponding to the current greeting time period at step (S537). After retrieving the greeting text, the controller 110 presents the retrieved greeting text in the form of a text balloon at step (S539). The greeting behavior can be presented as shown in FIG. 12, and the greeting text can be presented in the form of the text balloon of FIG. 12. The greeting text can be changed, depending on the greeting time period.

In the case wherein the character house presentation is terminated due to an event occurrence during the character's greeting behavior, if the greeting behavior is performed for an acceptable time, the controller 110 determines that the greeting behavior has been performed. It can be assumed for example, that the acceptable time can be 3 seconds or so, in an exemplary embodiment of the present invention.

Accordingly, the controller 110 determines whether the greeting behavior is continued over the acceptable time (3 seconds) at step (S541). If the greeting behavior has not continued over the acceptable time, the controller 110 maintains the greeting behavior and text balloon presentation at step (S557). While maintaining the greeting behavior and the text balloon presentation, the controller determines whether an event occurs, such that the character house presentation is terminated in the 3 second acceptable time at step (S559). If an event occurs within the acceptable time, the controller 110 stops the greeting behavior and then returns. In this case, the greeting behavior is performed again, if the character house is activated in the same greeting behavior time period.

If the greeting behavior has been performed for the acceptable time (3 seconds), the controller determines that the greeting behavior has been completely preformed and records the completion of the greeting behavior in the greeting behavior time period at step (S543). Next, the controller 110 determines whether the event presentation time has arrived at step (S545). The event can occur based upon a random probability that is set according to the times of the greeting behaviors.

If the event presentation time has arrived, the controller 110 presents the greeting event at step (S547).

Figure 21:
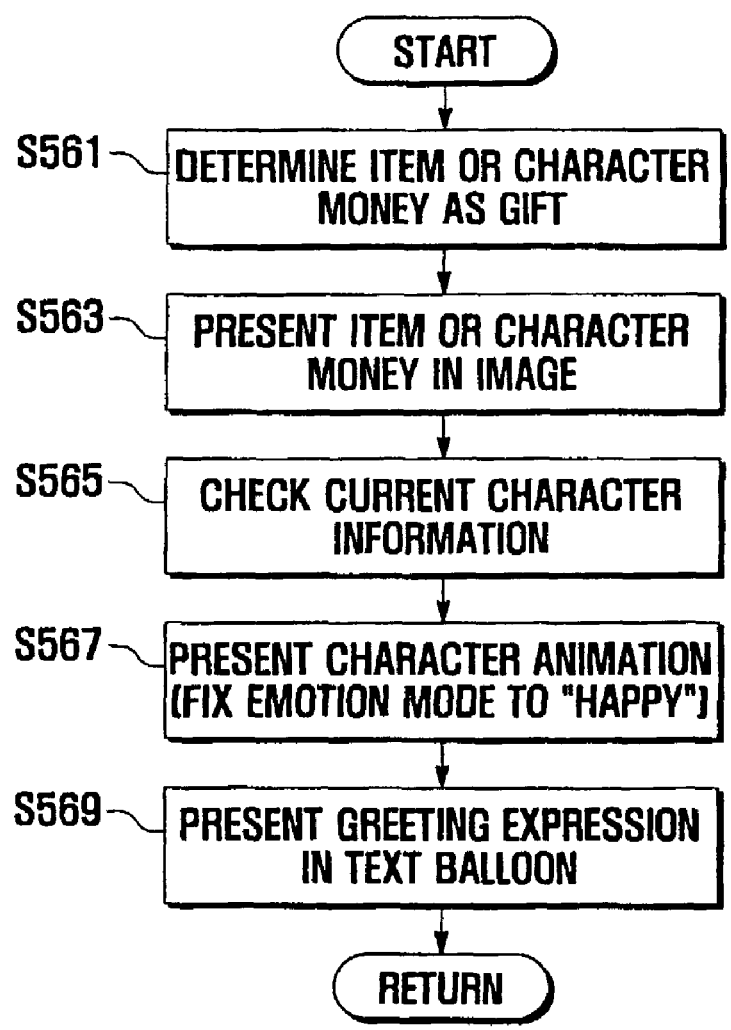
FIG. 21 is a flowchart illustrating a greeting event presentation procedure occurring during a greeting behavior of a character of a screen image presentation technique according to an exemplary embodiment of the present invention.

FIG. 21 is a flowchart illustrating a greeting event presentation procedure occurring during a greeting behavior of a character of a screen image presentation technique according to an exemplary embodiment of the present invention.

The greeting event can randomly occur while the character performs the greeting behavior, and the greeting event can be presented in substantially the same manner with the character's greeting behavior, with the exception of the screen layout and the text.

Referring to FIG. 21, the controller 110 selects an item or character money as a gift at the greeting event presentation time at step (S561), and presents an image corresponding to the item or the character money to give as the gift at step (S563). Next, the controller 110 checks the information of the character at step (S565) and animates the character at step (S567). Subsequently, the controller 110 presents the greeting text in the form of the text balloon at step (S569).

When presenting the character according to the greeting event, the controller 110 animates the character with the text and/or sound as shown in FIG. 13. At this time, the emotion mode of the character is fixed to "happy" and the character is presented with the item image and/or the character money image as the gift. The item image and the character money image provided in the greeting event presentation procedure can be displayed at the bottom left or bottom right portion of the character house as shown in FIG. 13, and the text expression related to the gift is presented in the form of a text balloon having for example, a 30% transparency.

After performing the greeting event presentation procedure as in FIG. 21 at step (S547) of FIG. 20, the controller 110 determines whether another period, for example, 10 seconds have elapsed after the presentation of the greeting expression text balloon at step (S549). If 10 seconds have elapsed, the controller 110 makes the text balloon and the character animation image disappear at step (S551).

If 10 seconds have not elapsed, the controller maintains the presentation of the current character animation and the greeting expression text balloon at step (S553). The greeting behavior of the character can be assumed for example, to be maintained for 10 seconds. Accordingly, until the greeting behavior of the character exceeds 10 seconds, the controller 110 maintains the greeting behavior of the character at steps (S549), (S553) and (S555). If 10 seconds have elapsed from the start of the greeting behavior of the character, the controller 10 makes the greeting expression text balloon and the character animation image disappear at step (S551).

As described above, if the current time is within a predetermined greeting time period, the controller 110 controls the character of the character house to show the greeting behavior corresponding to the greeting time period. The greeting behavior is provided for greeting the user of the mobile phone and is performed in every greeting time period. If the mobile phone is turned off or the character house is not activated, the greeting behavior of the character is skipped. In an exemplary embodiment of the present invention, the greeting behavior of the character is performed based upon a random probability, so as to give the user an unexpected gift. In an exemplary embodiment of the present invention, the gift-giving behavior is performed during the greeting behavior time, however, it can be performed at any time when the character house is presented. In the case wherein the gift-giving behavior is performed at any time when the character house is presented, the controller 110 can control the gift-giving behavior performed at the time when the character is presented.

In FIG. 19, the controller 110 controls the character to be in a normal behavior at step (S511) after performing the greeting behavior of the character when outside of the greeting time periods or after performing the greeting behavior. The character behaviors are presented in the procedure of FIG. 22A or FIG. 22B.

Figure 22A:
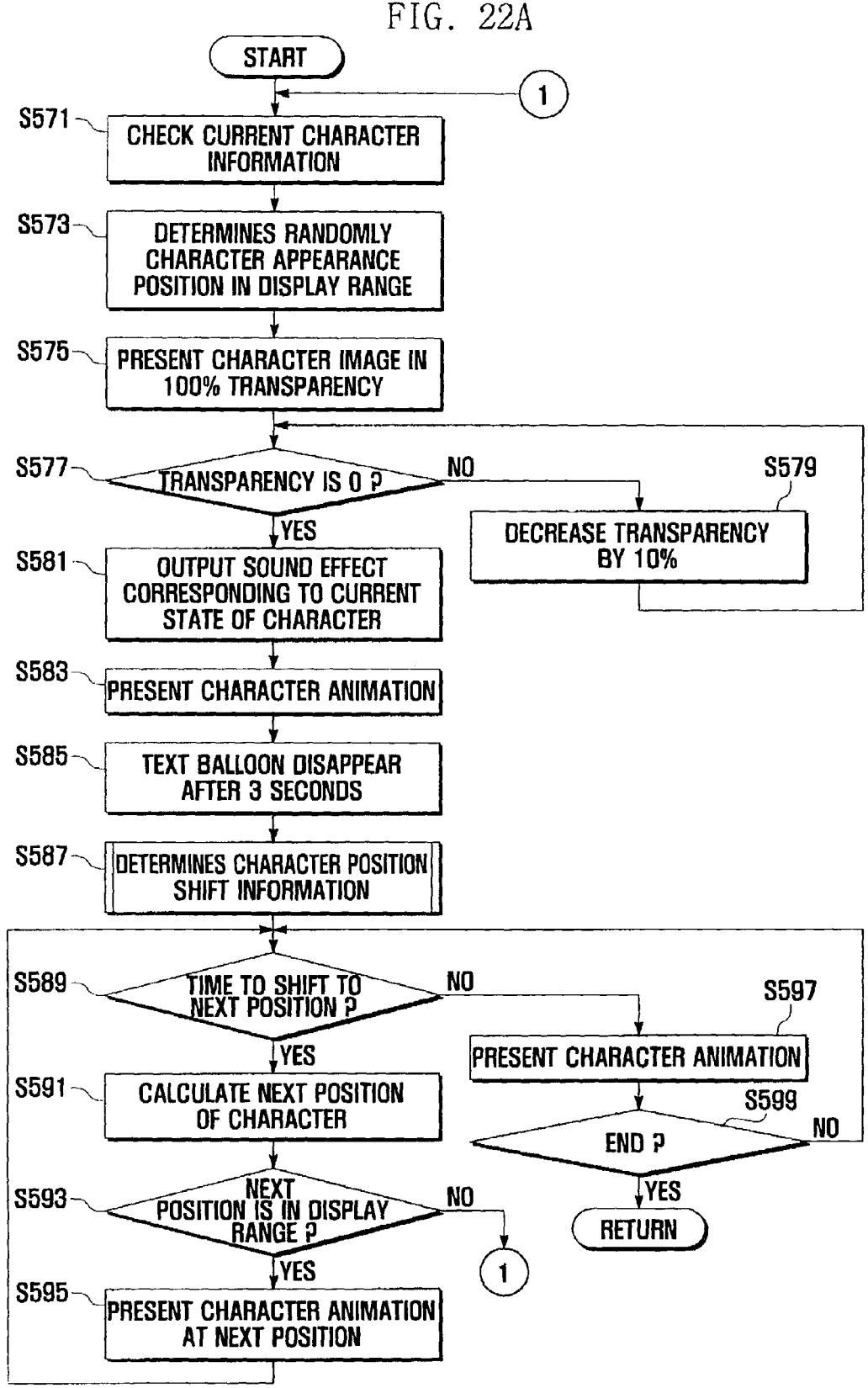
FIGS. 22A and 22B are flowcharts illustrating an animation behavior presentation procedure of a screen image presentation technique according to an exemplary embodiment of the present invention.
Figure 22B:
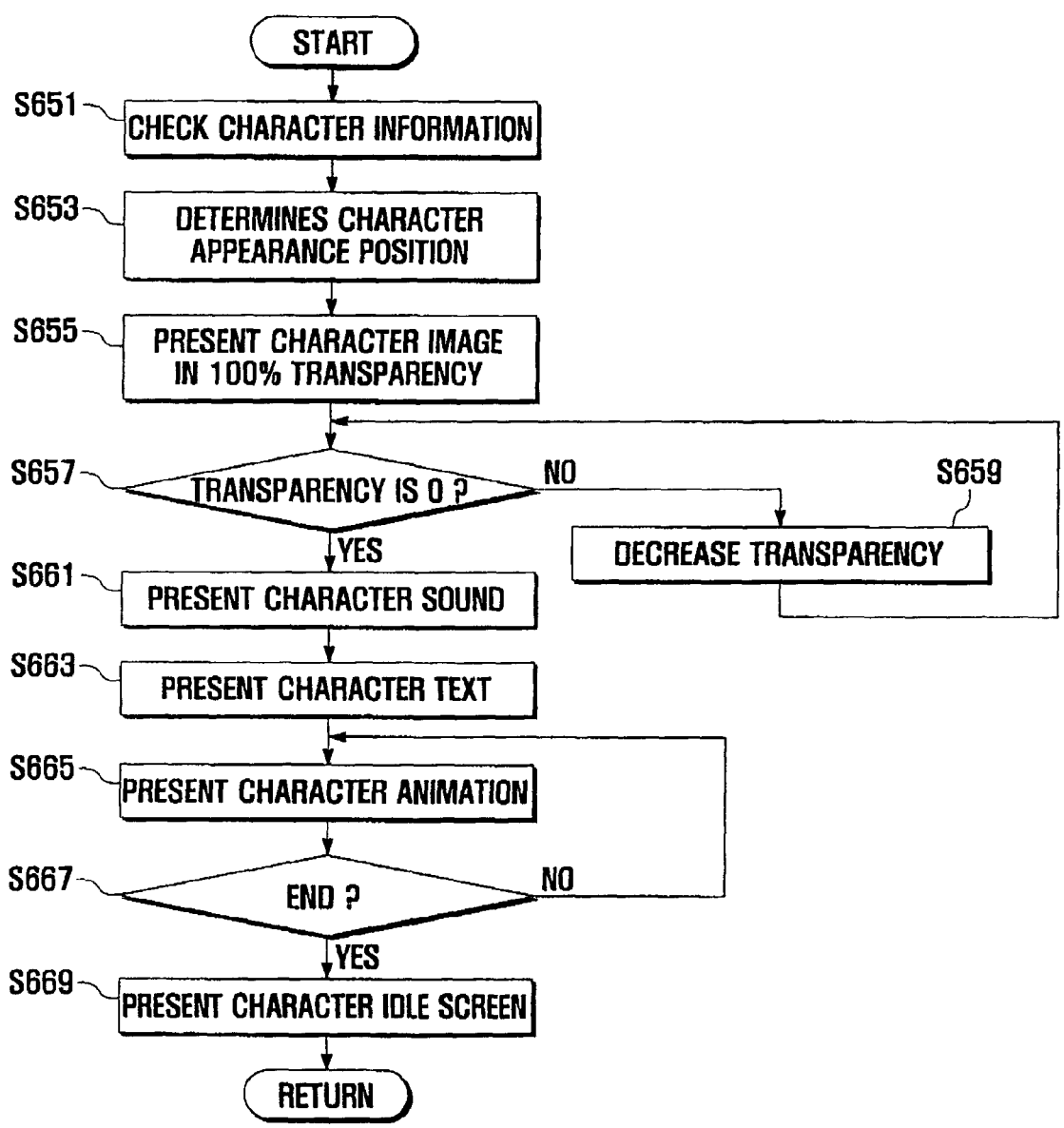

FIGS. 22A and 22B are flowcharts illustrating an animation behavior presentation procedure of a screen image presentation technique according to an exemplary embodiment of the present invention.

In FIG. 22A, the character is moving and animated together with text and sound for expressing the state and emotion of the character while the character house is presented. In FIG. 22B, the character is animated after the text and sound expression are presented in the character house.

The character behavior can be vividly expressed in the character house in various manners. For example, the character can be represented by a plurality of animation images such that the animation images are continuously displayed to form an animation of the character. Also, the character can be presented to move along a preset movement line. The character animation is implemented by presenting the animation images in series at a regular interval, similar to presenting the function items as shown in FIGS. 9E, 9H and 9K. The character movement is implemented by moving the character on the basis of a preset movement direction, movement distance and movement time. In order for the character to seamlessly move, the movement can be implemented with a plurality of images. FIG. 23 shows an exemplary, procedure for presenting character movement.

FIG. 22A shows a character movement behavior presentation procedure, and FIG. 22B shows a character gesture behavior presentation procedure.

Referring to FIG. 22A, the controller 110 checks information on the current character at step (S571), and determines an initial appearance position of the character (an X and Y coordinate in the screen of the display unit 143). The initial appearance position of the character can be randomly determined in a display range of the screen of the display unit 143. After the initial appearance position is determined, the controller 110 presents the character with 100% transparency at step (S575). With the 100% transparency, the character is invisible so that the background and items images are displayed on the screen of the display unit 143 as shown in FIG. 4A.

Next, the controller 110 decreases the transparency of the character image at a predetermined rate such that the character gradually appears in the character house. That is, the controller 110 controls operations of the mobile phone such that the character appears gradually by repeating steps (S577) and (S579). If for example, it is assumed that the transparency of the character image decreases by 10% at step (S579), the controller 110 controls operations of the mobile phone to gradually reduce the transparency of the character image to be opaque (alpha blending effect). Accordingly, the transparency of the character image decreases from 100% to 0% by 10% such that the character appears in the character as shown in FIG. 4B.

Next, the controller 110 outputs a sound effect representing the state of the character as shown in FIG. 4C at step (S581), animates the character as shown in FIG. 4D at step (S583), presents text expressing the state and emotion of the character in the text balloon during a predetermined presentation time as shown in FIG. 4E, and then terminates the animation of the character. Here, the presentation time is set to 3 seconds at step (S585), but embodiments of the present invention are not limited thereto. When presenting the character house in the above manner, the text balloon is presented after the appearance of the character in the order of FIGS. 4A to 4E, and presentation of the sound effect and the character animation.

The controller 110 determines a next position of the character and then performs movement of the character at steps (S589), (S597) and (S599). In order to present the character movement, the controller determines position shift information at step (S587). The position shift information is determined according to an exemplary procedure described in greater detail below with reference to FIGS. 23A and 23B.

Figure 23A:
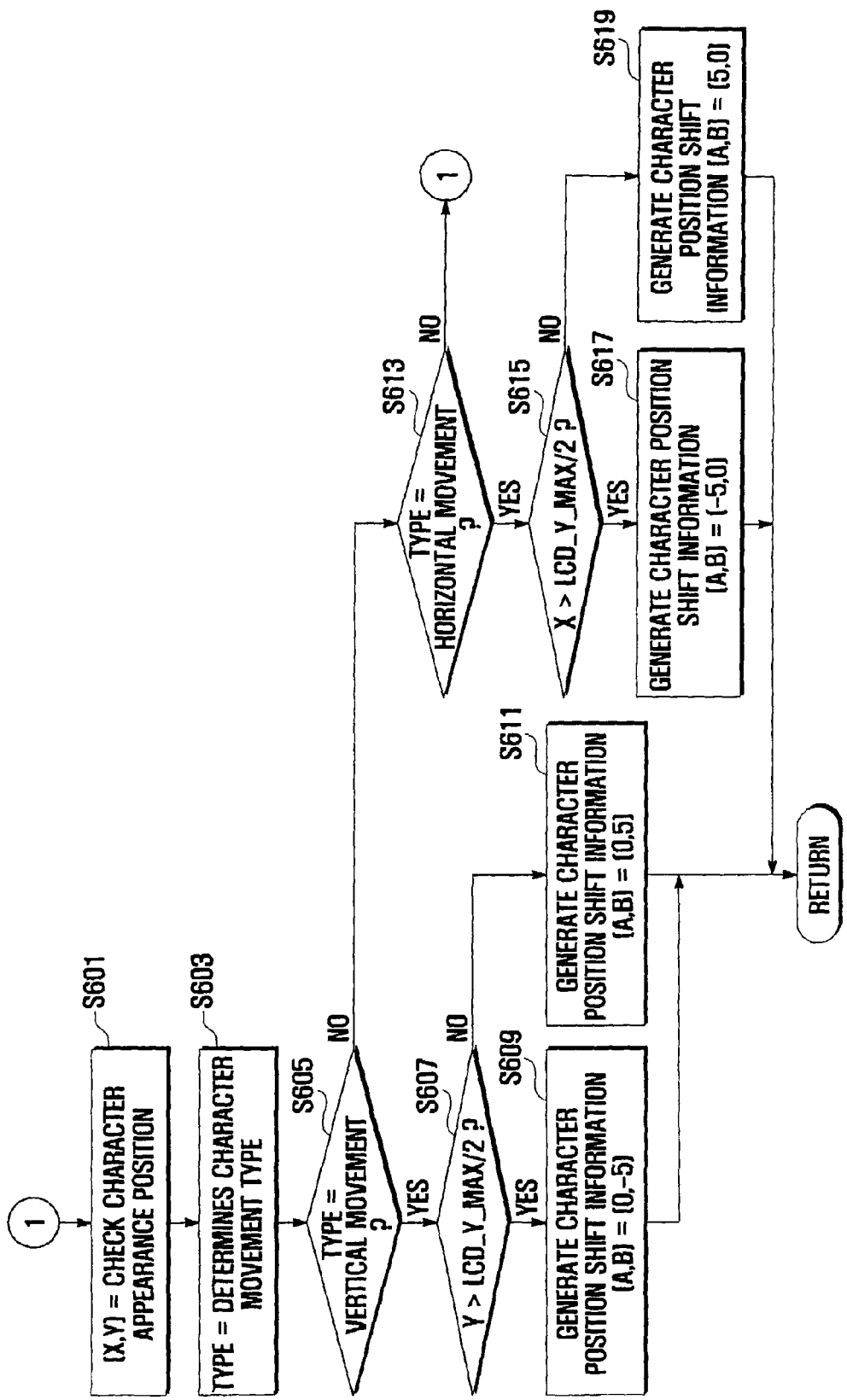
FIGS. 23A and 23B are flowcharts illustrating a character shift information determination procedure in detail according to an exemplary embodiment of the present invention.
Figure 23B:
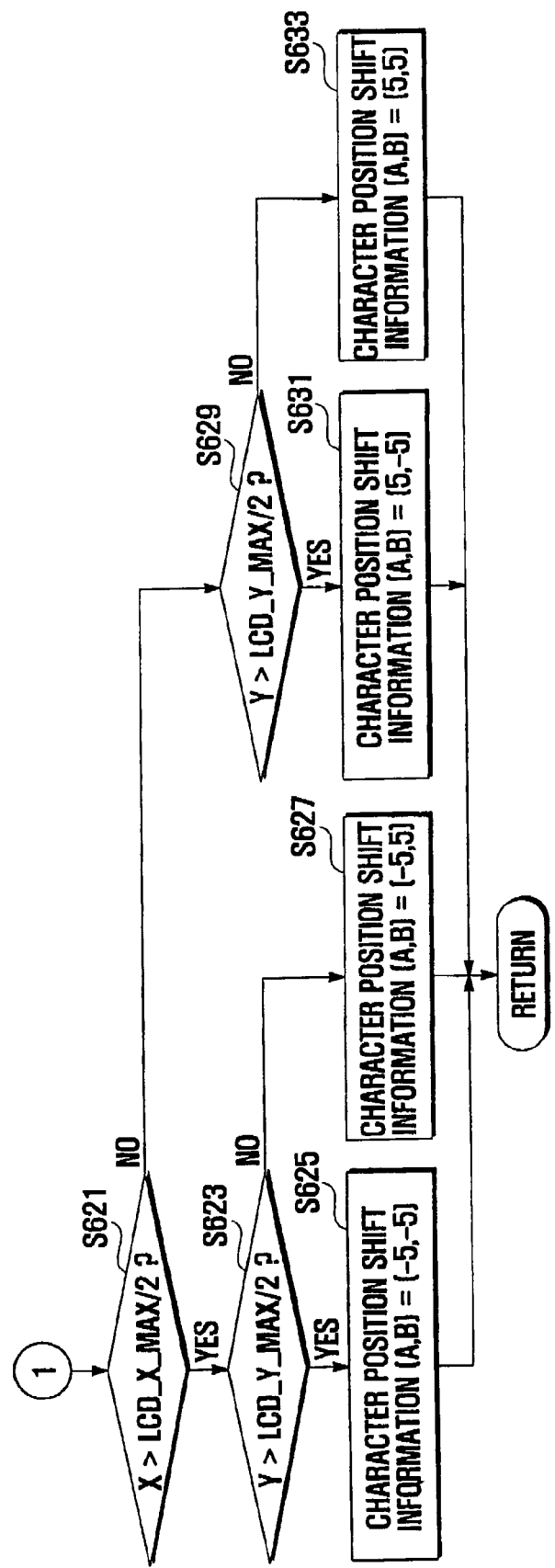

FIGS. 23A and 23B are flowcharts illustrating a character shift information determination procedure in detail.

Referring to FIGS. 23A and 23B, the controller 110 checks an initial appearance position of the character at step (S601), and determines a movement type of the character at step (S603). The movement type includes vertical movement, horizontal movement, and diagonal movement. The movement type is randomly selected among the three movement types at step (S603). It can be assumed for example, that the character moves by 5 pixels, but embodiments of the present invention are not limited thereto.

If the movement type is selected, the controller determines whether the movement type is vertical movement at step (S605). If the movement type is vertical movement, the controller 110 determines whether the character's appearance position is located at an upper half part of the screen of the display unit 143 at step (S607). If the character's appearance position is located at an upper half part of the screen of the display unit 143, the controller 110 generates character position down shift information ((A, B)=(0, −5)) at step (S609). If the character's appearance position is located at a lower half part of the screen of the display unit 143, the controller 110 generates character position up shift information ((A, B)=(0, 5)) at step (S611).

If it is determined, at step (S605), that the movement type is not vertical movement, the controller 110 determines whether the movement type is horizontal movement at step (S613). If the movement type is horizontal movement, the controller determines whether the character's appearance position is located at a right half part of the screen of the display unit 143 at step (S615). If the character's appearance position is located at the right half part of the screen of the display unit 143, the controller generates character position left shift information ((A, B)=(−5, 0)) at step (S617). If the character's appearance position is located at a left half part of the screen of the display unit 143, the controller 110 generates character position right shift information ((A, B)=(5, 0)) at step (S619).

If it is determined, at step (S615), that the movement type is not horizontal movement, the controller 110 regards the movement type as diagonal movement.

Diagonal movement includes a top-right to bottom-left movement, a top-left to bottom-right movement, a bottom-right to top-left movement, and a bottom-left to top-right movement.

If the movement type is diagonal movement, the controller determines whether the character's appearance position is located at the right half part (X>LCD_X_MAX/2) of the screen at step (S621) in FIG. 23B. If the character's appearance position is located at the right half part of the screen, the controller determines whether the character's appearance position is located at the upper half part (Y>LCD_Y_MAX/2)) of the screen at step (S623). If the character's appearance position is located at the upper half part, the controller 110 generates character position left-down shift information ((A, B)=(−5,−5)) at step (S625). If the character's appearance position is not located at the upper half part, the controller 110 generates character position left-up shift information ((A,B)=(−5,5)) at step (S627).

If it is determined, at step (S621), that the character's appearance position is not located at the right half part of the screen, the controller determines whether the character's appearance position is located at the upper half part (Y>LCD_Y_MAX/2)) of the screen at step (S629). If the character's appearance position is located at the upper half part, the controller 110 generates character position right-down shift information ((A,B)=(5,−5)) at step (S631). If the character's appearance position is not located at the upper half part, the controller 110 generates character position right-up shift information ((A,B)=(5,5)) at step (S633).

Returning to step (S587) of FIG. 22A, the controller 110 checks the appearance position and movement type of the character and calculates the position shift information on the basis of the appearance position and the movement type of the character. The movement direction of the character is changed according to the character's initial appearance position and the movement type of the character is randomly selected among the three movement types (vertical, horizontal, and diagonal movement). The movement direction is determined such that the character secures the longest length to move at an axis of the center of the screen.

If the position shift information is obtained, the controller 10 controls operations of the mobile phone such that the character moves in the movement direction and according to movement type at steps (S589) to (S599). The appearance position shift is performed in a predetermined interval. It can be assumed for example, that the character moves 20 pixels per second, but embodiments of the present invention are not limited thereto. The character's appearance position shift can be performed by moving 5 pixels every 0.25 seconds, but embodiments of the present invention are not limited thereto. The character is moving and animated at the same time. That is, the character moves in a direction determined at every predetermined time by a unit of predetermined number of pixels increment. The character can be animated or not animated while moving as desired.

The controller 110 determines whether the position shift time has arrived at step (S589). If the position shift time has not arrived, the controller 110 animates the character at step (S597).

If the position shift time has arrived, the controller 110 calculates a next position of the character at step (S591). The next position is obtained according to the procedure shown in FIGS. 23A and 23B. After obtaining the next position, the controller 110 determines whether the next position of the character is within a display range of the screen of the display unit 143 at step (S593). If the next position of the character is within the display range of the screen, the controller 110 controls operations of the mobile phone to move the character to the next position and animate the character at step (S595). The controller 110 moves the character on the screen of the display unit 143 in the predetermined movement direction at the predetermined movement times by a unit of predetermined number of pixels increment as shown in FIG. 4F and 4G.

If the character deviates from the display range of the screen of the display unit 143 while repeating the above operation, the controller 110 recognizes the deviation of the character and returns to step (S571) to show the idle mode screen as shown in FIG. 4H. Consequently, the presentations of FIGS. 4B to 4G are repeated.

The above operation is repeatedly performed while presenting the character house. If the presentation of the character ends at step (S599), the controller 110 terminates the behavior of the character.

The movement of the character is performed after the text expression of the character disappears as shown in FIGS. 4F and 4G. The movement direction of the character is randomly selected among the vertical, horizontal and diagonal directions. That is, the movement direction is determined such that the character secures the longest length to move at an axis of the center of the screen and the movement speed is determined to be, for example, 20 pixels per second. If the character moves across the border of the screen of the display unit 143 and disappears, the character house is presented with the character. After a period (for example, about 2 seconds), the operation depicted in FIG. 4B is performed.

As described above, the presentation of the character behavior in FIGS. 22A and 22B is performed by repeating the operations of FIGS. 4A to 4G. The character can be presented in a plurality of steps. A first step comprises an invisible character step as shown in FIGS. 4A and 4H, in which the character is not presented, yet the character house is displayed with the items and background.

A second step comprises a character presentation step, in which the character appears at a random position in the character house. When the initial appearance position of the character is close to the border of the screen of the display unit 143 such that the entire image of the character cannot be shown, the character, is not presented. The character can appear via a fade-in effect by decreasing the transparency of the character image. The transparency can be decreased from 100% to 0% (alpha blending image).

A third step comprises a sound effect output step as shown in FIG. 4C, in which a unique sound effect is output according to the state of the character after the character is completely presented. The sound effect is output once, but can be repeated.

A fourth step comprises an animation step as shown in FIG. 4D, in which the character is animated after the sound effect is output. The character animation is repeated until the character moves to disappear from the screen of the display unit 143.

A fifth step comprises a text presentation step as shown in FIG. 4E, in which the state and emotion of the character are presented in text. The text can be presented in the form of a text balloon as shown in FIG. 4E. The text balloon is presented with a semitransparent balloon having for example, a 30% transparency, in consideration of the time taken for reading the text. The text balloon disappears after for example, about 3 seconds.

A sixth step comprises a character movement step as shown in FIGS. 4F to 4G, in which a movement direction of the character is randomly determined. After the movement direction and distance is determined, the character moves according to the movement direction and distance. The character moves to disappear from the screen of the display unit 143.

Since the character appears at a random position, the character can appear at a different position at every appearance time. The movement direction is randomly determined, so the character can move in a different direction at every movement time. The sound effects and the texts can be prepared differently for expressing various states and emotions of the character. Since the appearance position, movement direction, sound effect and text are presented differently at every presentation timing, various character behaviors can be provided to the user.

At the initial character presentation time, the operations illustrated in FIGS. 4A to 4G are performed, and then the operations of FIGS. 4C and 4E can be skipped after the character moves and disappears from the screen of the display unit 143. In this case, the sound effect and the text balloon appear once, and the character appears at a random position and moves in a random direction.

Referring to FIG. 22B, the controller 110 checks information of the current character at step (S651), and determines a character appearance position at step (S653). The character appearance position can be a preset position on the screen of the display unit 143. In an exemplary embodiment of the present invention, the character appearance position is preset at a bottom right portion of the screen relative to the center of the screen of the display unit 143. After determining the character appearance position, the controller 110 presents the character with a 100% transparency at step (S655). Since the transparency is 100%, the character is invisible. Accordingly, the character house is displayed with only the background image and item images as shown in FIG. 4I.

Next, the controller 110 decreases the transparency of the character at a predetermined rate such that the character appears gradually. That is, the controller 110 repeats the steps (S657) and (S659) for gradually presenting the character. If it is assumed for example, that the transparency of the character image decreases 25% every 0.5 seconds, the character is completely presented in about 2 seconds (alpha blending effect). The transparency of the character image decreases in an order of 100%, 75%, 50%, 25% and 0%, such that the character house is displayed as shown in FIG. 4J.

After the character has completely appeared, the controller 110 outputs a sound effect corresponding to the state of the character as shown in FIG. 4C at step (S661), and then presents text associated with the state and emotion of the character in the form of a text balloon during a predetermined text presentation time as shown in FIG. 4L at step (S663). The text presentation time can be set for example, to about 1.5 seconds, in consideration of the time taken for reading the text.

After outputting the sound effect and presenting the text, the controller 110 presents a character animation at steps (S665) to (S669). The character animation is repeated until the character disappears from the character house. As described above, the character presentation is performed in the order of character appearance, output of sound effects, presenting text balloon and character animation.

As described above, the screen image presentation method of exemplary embodiments of the present invention presents the character house (screen) in a specific operation (idle mode) of the mobile phone. In the idle mode, the controller of the mobile phone presents a character house by arranging a background and items in the character house and presents a character. The character expresses state and emotion in the forms of sound effects and text. The character can move in random directions and shows animation on the screen of the display unit 143. The background image is used as a background of the house and can be replaced with another image so as to graphically show the passage of time using the character house. The items presented with the character house include movement items, decoration items and function items. The function items are used for improving user convenience by showing system information of the mobile phone. The decoration items are used for improving the aesthetic effect of the screen of the mobile phone. The motion items are used to make the screen dynamic by moving around the screen house. Also, the character house can be implemented with a special expression function such that the character gives special information at predetermined time periods or greets the user. Also, the character house can be implemented such that the character gives an item or character money as a gift at unexpected times while the character greets the user, resulting in user's enjoyment.

In an exemplary embodiment of the present invention, the character house is structured by presenting the elements in an order of background, items and character. However, the presentation order can be varied. In an exemplary embodiment of the present invention, the character house is configured such that the greeting and event presentation are performed when the item is presented, however, the greeting and event presentation can be performed at other times, such as when the background or character is presented.

In an exemplary embodiment of the present invention, the character house is presented in a specific mode (for example, idle mode). If the mobile phone is activated (for example, a clam shell mobile phone is unfolded, a slide mobile phone is slid open, a function is terminated (for example, termination of communication or message checking), or a specific key is pushed in the idle mode without the character house presentation), the mobile phone presents the character house while performing these process.

The character house comprises one or more of a background, items and character. In an exemplary embodiment of the present invention, the elements constituting the characters are presented in the order of background, items and character. However, the presentation order can be varied.

The items associated with the character house include the decoration items, motion items and function items. The function items present information on the specific functions of the mobile phone as shown in FIGS. 9A to 9L, and FIGS. 18A to 18D. Accordingly, if a specific function item is selected while the character house is presented, the controller 110 controls operations of the device to present the system information associated with the selected function item. For example, the function item has a menu function for showing the menu associated with the selected function item. If a specific function item is selected while the character house is presented, the controller 110 highlights the selected function item with a menu such that it is possible to enter a menu-specific mode by selecting the menu.

The function item can be a single function item or a multifunction item which groups a plurality of function items. The function items constituting the multifunction item have similar functions. For example, the mailbox item as a multiple function item consists of SMS, EMS and MMS function items, such that if the mailbox item is selected, the function items constituting the mailbox item are presented. Each function item has a menu presentation function for guiding the functions related to the item. Accordingly, if one of the function items constituting the multiple function item is selected, the controller 110 shows the grouped function items. Then, if one of the group function items is selected, the controller 110 activates the selected function to display the item-related information.

Figure 24:
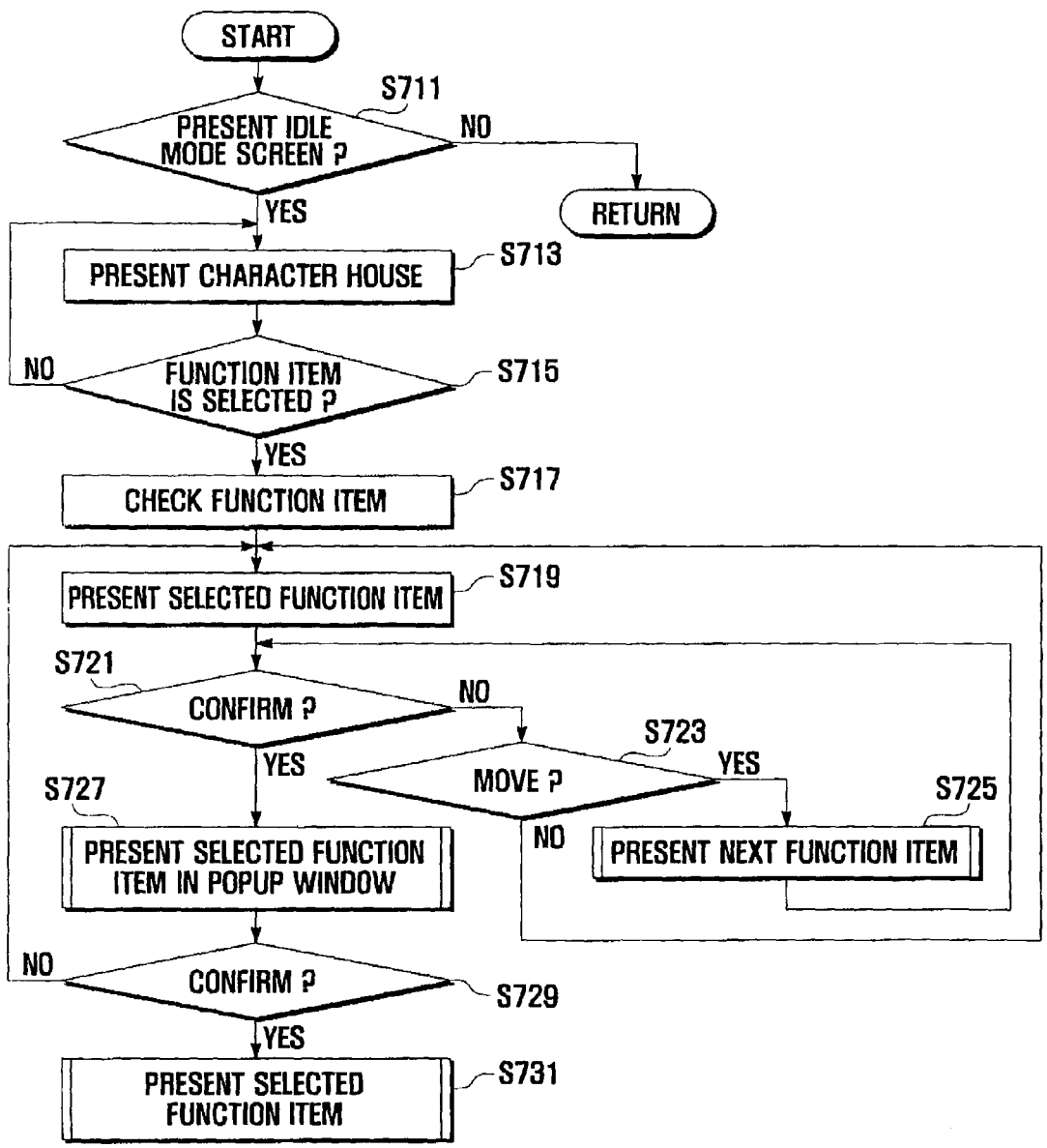
FIG. 24 is a flowchart illustrating a function item-related information processing procedure of a screen image presentation method according to an exemplary embodiment of the present invention.
Figure 25:
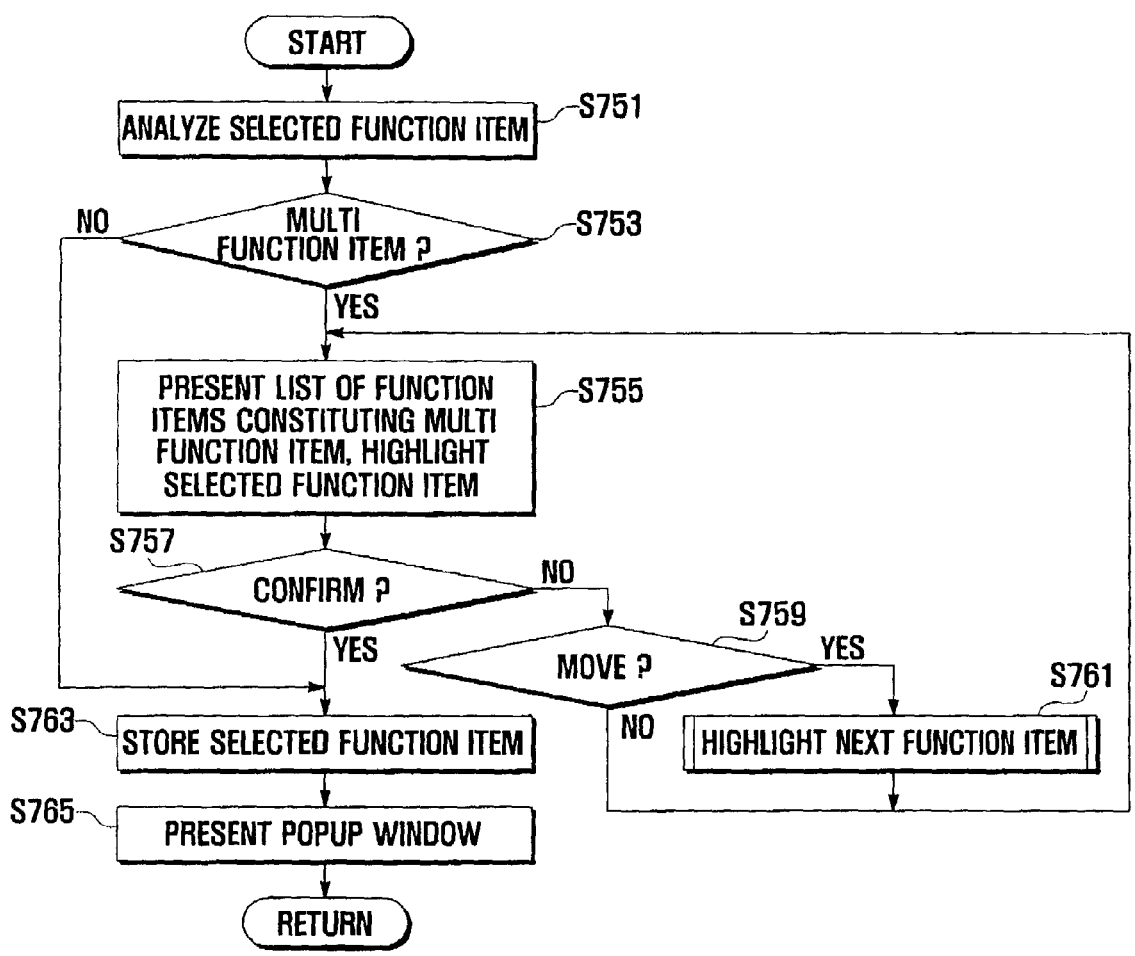
FIG. 25 is a flowchart illustrating the function item presentation procedure of FIG. 24 according to an exemplary embodiment of the present invention.
Figure 26:
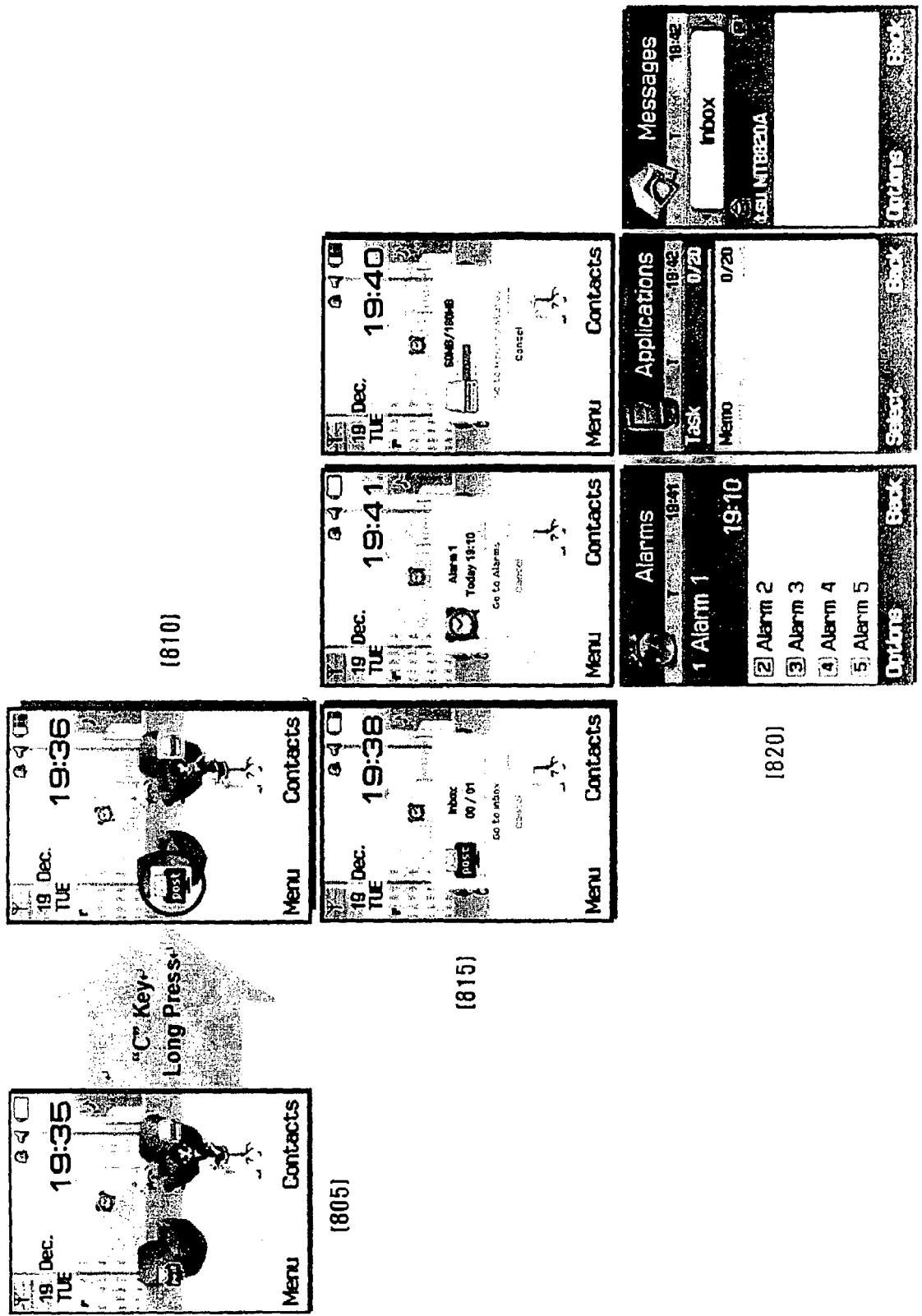
FIG. 26 shows screen images illustrating steps of presenting the function item-related information of FIG. 24 according to an exemplary embodiment of the present invention.

FIG. 24 is a flowchart illustrating a function item-related information processing procedure of a screen image presentation method according to an exemplary embodiment of the present invention, FIG. 25 is a flowchart illustrating a function item presentation procedure of FIG. 24, FIG. 26 shows screen images 805 to 820 illustrating steps of presenting the function item-related information of FIG. 24, and FIG. 27 shows screen images 852 to 875 illustrating steps of presenting function items grouped in a multifunction item of FIG. 24.

Referring to FIG. 24, the controller 110 determines whether the mobile phone is in the idle mode at step (S711), and presents a character house at step (S713) on the screen of the display unit 143 if the mobile phone is in the idle mode. The character house is presented as a screen image 805 of FIG. 26 in accordance with the procedures of FIGS. 14 to 23.

After presenting the character house, the controller 110 determines whether a function item selection signal is input at step (S715). If a function item selection signal is input, the controller 110 checks the information on the selected function item at step (S717). The function item of the character house gives a decoration effect to the character house of the mobile phone and provides a menu for activating a function corresponding to the function. If the function item is selected, the controller 110 shows the selected function in an active state according to the following procedure.

If a signal for selecting the function item is input by pushing a special key of the keypad unit 141 while the character house is presented, the controller 110 checks the information of the selected function item at step (S717). The special key can be an item presentation mode key for presenting the function item of the character house, a key which is not used in the idle mode (for example, a "clear key"), or a specific key assigned for operating in the idle mode. In an exemplary embodiment of the present invention, the clear key is used for generating the function item selection signal. If the key is pushed for a preset duration, the controller 110 recognizes the key input as the function item selection signal at step (S715).

After checking the information on the selected function item, the controller 110 activates the selected function item so as to highlight the selected function item on the screen of the display unit 143 as a screen image 810 of FIG. 26. In this case, other function items are presented so as to be differentiated from other item types (for example, decoration items and motion items). The screen image 810 of FIG. 26 shows an example of a character house displayed when the item activation key (for example, the "clear key") is pushed.

In screen image 810, a mailbox item is selected. If the item activation key is input, the controller 110 highlights the mailbox item as the selected function item at step (S719), as shown in the screen image 810 of FIG. 26, and presents unselected function items (in an exemplary embodiment of the present invention, an alarm clock item and memory monitor item) so as to be differentiated from other item types (for example, decoration items and motion items). The unselected function items are presented on a transparent layer in the screen image 810 of FIG. 26. The unselected function items are presented to be differentiated from other item types to allow the user to recognize the function items provided with the character house.

If a direction key (or navigation key) is input while the selected function item is activated as shown in the screen image 810, the controller 110 detects the key input at step (S723), and navigates a cursor to a next function item such that the next function item is highlighted at step (S725). The unselected function items are presented to be differentiated from other items. While the character house is presented as the screen image 805, the controller 110 navigates the cursor on the mailbox item, alarm clock item, and memory monitor item. At this time the unselected function items are presented so as to be differentiated from the other items.

If a confirmation key (or an ok key) is input while a specific function item is highlighted as shown in the screen image, the controller 110 detects the confirmation key input at step (S721), and presents the selected function item in the form of a function item popup window as shown in a screen image 815 at step (S727).

When presenting the selected function item in the form of the function item popup window, detailed information associated with the function item is provided in the popup window. For example, if the confirmation key is pushed while the mailbox item is highlighted, a mailbox popup window is presented together with information, such as a number of received messages and a number of unread messages. Similarly, an alarm clock popup window is presented with information on the alarm schedule times, and the memory monitor popup window is presented with information on the total memory and utilized memory.

If the confirmation key is input while a specific function item popup window is presented, the controller 110 detects the confirmation key input at step (S729), and presents detailed information on the function as shown in a screen image 820 of FIG. 26 at step (S731).

The function item can be a signal function item or a multifunction item grouping similar function items. When presenting the selected function item in a popup window at step (S727), the controller 110 can present different popup windows according to the type of the function item. FIG. 25 is a flowchart illustrating a popup window presentation procedure of step (S727) of FIG. 24 in greater detail.

Referring to FIG. 25, if a confirmation key is pushed while the selected function item is presented as shown in the screen image 810 of FIG. 26, the controller 110 analyzes the selected function item at step (S751), and determines whether the selected function item is a multifunction item (grouped function item) at step (S753). If the selected function item is a multifunction item, the controller 110 presents the function items constituting the multifunction item and places a cursor on one of the listed function items as shown in the screen image 854 of FIG. 27 at step (S755). The cursor navigates the function items by navigation key manipulation. Next, the controller 110 determines whether a confirmation key is pushed while the cursor is placed on one of the function items as shown in screen images 854 and 856 of FIG. 27 at step (S757). If a confirmation key is input, the controller 110 stores the selected function item at step (S763) and presents a popup window of the selected function item as shown in screen images 858 and 860 of FIG. 27 at step (S765).

If a confirmation key is input while the function item is presented in the form of the popup window, the controller 110 presents a menu list associated with the function item as shown in screen images 875 of FIG. 27. If a cancel key is input while the function item is presented in the form of the popup window, the controller 110 repeats the step (S755).

If the confirmation key is not input at step (S757), the controller 110 determines whether navigation key is input at step (S759). If the navigation key is input, the controller 110 places the cursor on the next function item as shown in the screen image 856 of FIG. 27 at step (S761) and repeats the step (S755).

If it is determined that the selected function item is not a multifunction item at step (S753), the controller 110 determines that the selected function item is a single function item. When the selected function item is a single function item, the steps (S755) to (S761) are skipped, such that the controller 110 stores the selected function item at step (S763) and presents a popup window of the selected function item at step (S765).

As described above, a function item presentation mode is activated while the character house is presented, and the controller 110 presents the function items so as to be differentiated from other items and highlights a selected function item. If a confirmation key is input while a function item is selected, the controller 110 presents the selected function item in the form of a popup window. If a confirmation key is input while the selected function item is presented in the form of the popup window, the controller 110 activates a menu mode corresponding to the selected function item to allow the user to select a menu option.

The function item comprises a single function item and a multifunction item grouping a plurality of single function items. If a multifunction item is selected, the controller 110 presents all of the single function items constituting the selected multifunction item. If one of the single function items constituting the multifunction item is selected, the controller 110 presents the selected single function item in the form of a popup window. If a confirm key is input while the single function item is presented in the form of a popup window, the controller 110 activates a menu execution mode to allow the user to select a menu option.

Although exemplary embodiments of the present invention have been described in detail hereinabove, it should be clearly understood that many variations and/or modifications of the basic inventive concepts taught herein which may appear to those skilled in the present art will still fall within the spirit and scope of the present invention, as defined in the appended claims and equivalents.

As described above, the character house of exemplary embodiments of the present invention is a virtual space in which an artificial intelligent character resides, talks and moves, such that a user recognizes a state of a mobile phone and/or terminal, by means of the character house. The character house facilitates learning of the functions of the mobile phone and attracts the user's interest to the mobile phone.

The character house of exemplary embodiments of the present invention is presented with a character, background image, items and animation. The character can present a sound effect and text expression reflecting its condition and emotion according to a character scenario, move around the character house, and show animation. The character can express a state and emotion of the mobile phone in various manners so as to make the character house dynamic.

The background is used for expressing the character house by changing the background image according to a passage of time, whereby the user can determine the current time from the character house.

The items include decoration items, motion items and function items. The function items show system information on the mobile phone so as to improve user convenience. The decoration items increase the aesthetic sense of the character house. The motion items move around in the character house so as to make the character house dynamic. The function item especially provides a menu execution function such that the user can access a menu associated with a menu represented by the menu item. A function menu item can be designed so as to group a plurality of similar function items.

The character house can be implemented with a special expression method in which the character greets the user of the mobile phone with an appropriate sound, text and behavior at predetermined time periods of the day, so as to make the mobile phone user-friendly. Also, the character house can be implemented such that the character randomly gives gifts to the user, resulting in enjoyment of the user.

What is claimed is:

1. A screen image presentation apparatus of a device, comprising:
   a memory, for storing character house data including character quotient information, a background where the character resides, and at least one function item for executing functions of the device;
   a controller, for controlling a display to present character quotient information, the character house, and provide information when a function item is selected on a function represented by the selected function item; and
   the display, for displaying the character house including the function item and displaying a character quotient module representing a physical quotient, an emotion quotient, an intelligent quotient, and a social quotient under the control of the controller.

2. The screen image presentation apparatus of claim 1, wherein the character house is presented in an idle mode of the device.

3. The screen image presentation apparatus of claim 1, wherein the device comprises a mobile phone.

4. The screen image presentation apparatus of claim 1, wherein the controller is configured to present, when the function item is selected, a menu window listing menu options associated with the function represented by the function item.

5. The screen image presentation apparatus of claim 4, wherein the controller is configured to present, when the function item is selected, a function item image and information associated with the function represented by the function item in the form of a popup window.

6. The screen image presentation apparatus of claim 5, wherein the function item comprises:
 a message box item for informing a user of a number of unread messages;
 an alarm clock item for informing the user of scheduled alarm times; and
 a memory monitor item for informing the user of a memory utilization.

7. The screen image presentation apparatus of claim 5, wherein the character house further comprises:
 at least one motion item which is configured to move along a preset movement line in the character house; and
 at least one decoration item which is fixedly arranged at a predetermined position in the character house for decorating the character house.

8. The screen image presentation apparatus of claim 7, wherein the background comprises a plurality of background images presented for different time periods of day.

9. The screen image presentation apparatus of claim 4, wherein the function item comprises:
 single function items, each representing a function of the device; and
 multifunction items, each grouping a plurality of single function items.

10. The screen image presentation apparatus of claim 9, wherein the controller is configured to present, if one of the multifunction items is selected, all of the single function items grouped in the multifunction item, and present, if one of the single function items is selected, a function item image and information associated with the function represented by the function item, in the form of a popup window.

11. The screen image presentation apparatus of claim 10, wherein each multifunction item comprises a message box item grouping a text message item, an email message item, and a multimedia mail item.

12. The screen image presentation apparatus of claim 10, wherein the multifunction items comprise an alarm clock item which groups a schedule item and a to-do item.

13. A screen image presentation method for a device, comprising:
 presenting a character house including a character expressed by character quotient information comprising'a physical quotient, emotion quotient, intelligent quotient, and social quotient, a background where the character resides, and at least one function item in an idle mode of the device; and
 presenting, when the function item is selected while the character house is presented, information on a function represented by the function item together with a function item image.

14. The screen image presentation method of claim 13, wherein the device comprises a mobile phone.

15. The screen image presentation method of claim 13, further comprising presenting, if the function item is selected while the information on the function represented by the function item is presented, a menu associated with the function item.

16. The screen image presentation method of claim 15, wherein the information on the function and the function item image are presented in the form of a popup window.

17. The screen image presentation method of claim 16, wherein the function item comprises a message item for informing a user of unread messages, wherein informing the user of unread messages comprises:
 checking, if the message item is selected, unread messages;
 presenting, if at least one unread message exists, a number of unread messages in the form of a popup window together with the message item; and
 presenting, if the message item is selected while the number of the unread message is presented, a menu for inspecting the unread messages.

18. The screen image presentation method of claim 17, wherein informing the user of unread messages further comprises highlighting, if at least one unread message exists, the message item before presenting the number of the unread messages in the form of the popup window.

19. The screen image presentation method of claim 16, wherein the function item comprises an alarm clock item for informing a user of scheduled alarms, wherein informing the user of scheduled alarms comprises:
 checking, if the alarm clock item is selected, scheduled alarms;
 presenting, if at least one scheduled alarm exists, an alarm scheduled at a closest scheduled alarm time subsequent to the current time in the form of a popup window together with the alarm clock item; and
 presenting, if the alarm clock item is selected while the alarm scheduled at the closest scheduled alarm time subsequent to the current time is presented, a menu for inspecting the scheduled alarms.

20. The screen image presentation method of claim 19, wherein informing the user of scheduled alarms further comprises animating, if at least one scheduled alarm exist, the alarm item before presenting the alarm scheduled at the closest scheduled alarm time subsequent to the current time in the form of the popup window.

21. The screen image presentation method of claim 16, wherein the function item comprises a memory monitor item for informing a user of memory utilization, wherein informing the user of memory utilization comprises:
 checking, if the memory monitor item is selected, total memory capacity and available memory capacity; and
 presenting information on the total memory capacity and available memory capacity in the form of a popup window together with the memory monitor item.

22. The screen image presentation method of claim 21, wherein informing the user of memory utilization further comprises animating, if the memory monitor item is selected, the memory monitor item before presenting the information on the total memory capacity and available capacity in the form of the popup window.

23. The screen image presentation method of claim 16, wherein the character house further comprises:
   at least one motion item which is configured to move along a preset movement line in the character house; and
   at least one decoration item which is fixedly arranged at a predetermined position in the character house for decorating the character house.

24. The screen image presentation method of claim 23, wherein the background comprises a plurality of background images presented for different time periods of a day.

25. The screen image presentation method of claim 15, wherein the function item comprises:
   single function items, each representing a function of the device; and
   multifunction items, each grouping a plurality of single function items.

26. The screen image presentation method of claim 25, wherein presenting information on a function represented by the function item together with a function item image comprises presenting, if one of the multifunction items is selected, all of the single function items grouped in the multi function item, and presenting, if one of the single function items is selected, a function item image and information associated with a function represented by the function item, in the form of a popup window.

27. The screen image presentation method of claim 26, wherein the multifunction items comprise a message box item which groups a text message item, an email message item, and a multimedia mail item, wherein presenting the message item comprises:
   presenting, if the message box item is selected, the text message, email message, and multimedia mail items;
   checking, if one of the items constituting the message item is selected, unread messages of a selected item;
   presenting, if at least one unread message exists, the number of the unread messages of the selected item in the form of a popup window together with the selected item; and
   presenting, if the item is selected while the number of the unread messages is presented, a menu for inspecting the messages.

28. The screen image presentation method of claim 26, wherein the multifunction item comprises an alarm clock item which groups a schedule item and a to-do item, wherein presenting the alarm clock item comprises:
   presenting, if the alarm clock item is selected, the schedule item and the to-do item;
   checking, if one of the items is selected, scheduled alarms of the selected item;
   presenting, if at least one scheduled alarm exists, information on the scheduled alarms in the form of a popup window together with the selected item; and
   presenting, if the item is selected while the information on the scheduled alarm is presented in the form of the popup window, a menu for inspecting the scheduled alarms.

* * * * *